US011367264B2

(12) United States Patent
Trinh et al.

(10) Patent No.: US 11,367,264 B2
(45) Date of Patent: Jun. 21, 2022

(54) SEMANTIC INTERIOR MAPOLOGY: A TOOL BOX FOR INDOOR SCENE DESCRIPTION FROM ARCHITECTURAL FLOOR PLANS

(71) Applicant: The Regents of the University of California, Oakland, CA (US)

(72) Inventors: Viet Trinh, Santa Cruz, CA (US); Roberto Manduchi, Santa Cruz, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 16/932,438

(22) Filed: Jul. 17, 2020

(65) Prior Publication Data
US 2021/0019954 A1    Jan. 21, 2021

Related U.S. Application Data

(60) Provisional application No. 62/875,414, filed on Jul. 17, 2019.

(51) Int. Cl.
    *G06T 19/20* (2011.01)
    *G06T 17/20* (2006.01)
(52) U.S. Cl.
    CPC .............. *G06T 19/20* (2013.01); *G06T 17/20* (2013.01); *G06T 2219/004* (2013.01)

(58) Field of Classification Search
    CPC .................... G06T 19/20; G06T 17/20; G06T 2219/004; G06T 19/003
    See application file for complete search history.

(56) References Cited

U.S. PATENT DOCUMENTS

| | | | |
|---|---|---|---|
| 8,705,893 B1* | 4/2014 | Zhang | G06T 7/74 382/285 |
| 2015/0237509 A1* | 8/2015 | Chao | H04W 4/33 370/255 |
| 2017/0148211 A1* | 5/2017 | Zakhor | H04N 13/243 |
| 2019/0132815 A1* | 5/2019 | Zampini, II | G06Q 50/06 |

* cited by examiner

*Primary Examiner* — Said Broome
(74) *Attorney, Agent, or Firm* — Gates & Cooper LLP

(57) ABSTRACT

A computer implemented method or system including a map conversion toolkit and a map Population toolkit. The map conversion toolkit allows one to quickly trace the layout of a floor plan, generating a file (e.g., GeoJSON file) that can be rendered in two dimensions (2D) or three dimensions (3D) using web tools such as Mapbox. The map population toolkit takes the scan (e.g., 3D scan) of a room in the building (taken from an RGB-D camera), and, through a semi-automatic process, generates individual objects, which are correctly dimensioned and positioned in the (e.g., GeoJSON) representation of the building. In another example, a computer implemented method for diagraming a space comprises obtaining a layout of the space; and annotating or decorating the layout with meaningful labels that are translatable to glanceable visual signals or audio signals.

21 Claims, 18 Drawing Sheets

FIG. 8A

SEMANTIC INTERIOR MAPOLOGY: A TOOL BOX FOR INDOOR SCENE DESCRIPTION FROM ARCHITECTURAL FLOOR PLANS

CROSS REFERENCE TO RELATED APPLICATIONS

This application claims the benefit under 35 U.S.C. Section 119(e) of and commonly-assigned U.S. Provisional Patent Application No. 62/875,414, filed Jul. 17, 2019, by Viet Trinh and Roberto Manduchi, entitled "SEMANTIC INTERIOR MAPOLOGY: A TOOL BOX FOR INDOOR SCENE DESCRIPTION FROM ARCHITECTURAL FLOOR PLANS," which application is incorporated by reference herein.

STATEMENT REGARDING FEDERALLY SPONSORED RESEARCH AND DEVELOPMENT

This invention was made with Government support under Grant No. R01 EY029260, awarded by the National Institutes of Health. The Government has certain rights in the invention.

BACKGROUND OF THE INVENTION

1. Field of the Invention

The present invention relates to methods and systems for annotating floorplans.

2. Description of the Related Art

Many travelers may be confused when moving in complex interior or exterior spaces, especially if they have visual or cognitive impairments. What is needed is a user friendly system providing meaningful annotations that can be used to assist with navigation within the space. The present invention satisfies this need.

SUMMARY OF THE INVENTION

The Semantic Interior Mapology (SIM) toolbox according to one or more examples described herein enables conversion of floor plans and of room contents (such as furnitures) to vectorized form. In one or more examples, the toolbox is composed of the Map Conversion toolkit and the Map Population toolkit. The Map Conversion toolkit allows one to quickly trace the layout of a floor plan, generating a file (e.g., GeoJSON file) that can be rendered in two dimensions (2D) or three dimensions (3D) using web tools such as Mapbox. The Map Population toolkit takes the scan (e.g., 3D scan) of a room in the building (taken from an RGB-D camera), and, through a semi-automatic process, generates individual objects, which are correctly dimensioned and positioned in the GeoJSON representation of the building. SIM is easy to use and produces accurate results even in the case of complex building layouts. Conversion of the floor plan of a building, and of its content, into a vectorized form can be used, for example, for an online 3D display.

A method or system according to the present disclosure can be embodied in many ways including, but not limited to, the following.

1. A computer implemented system, comprising:
one or more processors; one or more memories; and one or more programs (e.g., one or more tools or one or more applications) stored in the one or more memories, wherein the one or more programs executed by the one or more processors:
receive a floorplan of a scene;
provide one or more tools for tracing a layout of the floorplan so as to generate an annotated floorplan;
generate a map representing the annotated floorplan in two dimensions or three dimensions;
receive a scan of an object in a space in the floorplan;
associate the scan with the annotated floorplan, or register floorplan coordinates of the annotated floor plan with scan coordinates of the scan so as to populate the map with the object correctly positioned in the map.

2. A computer implemented system of example 1, wherein the one or more programs generate the floorplan coordinates of the scene by:
providing a set of grid lines on the floor plan of the scene;
highlighting segments of the grid lines selected by a user, each of the segments tracing a wall on the floorplan so that the segment is colinear with the wall;
indicating intersection points between the segments;
highlighting the intersection points comprising corner intersection points between adjacent walls; and
storing the corner points as the floorplan coordinates in a database or list.

3. The system of examples 1 or 2, further comprising converting the floorplan coordinates into GeoJSON format.

4. The system of any of the examples 1-3, wherein the one or more programs generate the map by converting the floorplan coordinates, wherein the converting comprises the one or more programs:
obtaining geodetic coordinates of exterior corners of exterior walls on the floorplan;
obtaining the floorplan coordinates of the exterior corners;
determining a transformation function that transforms the geodetic coordinates of the exterior corners to the floorplan coordinates of the exterior walls; and
converting all the corner points in the floorplan coordinates into the geodetic coordinates using the transformation function.

5. The system of any of the examples 1-4, wherein the one or more programs:
obtain the scan of object in a room of the scene comprising an interior scene mapped using the floorplan, wherein the scan identifies the object using a mesh; and
orient the mesh with the floorplan.

6. The system of example 5, wherein the one or more programs orient the mesh so that a wall of the room identified using the mesh is aligned with a cartesian axis of the floorplan coordinates.

7. The system of example 5 or 6, wherein the one or more programs:
select all vertices in the mesh whose normal vector is approximately orthogonal to a vertical cartesian axis orthogonal to the floorplan;
compute one or more angles between one or more of the normal vectors and one of the horizontal cartesian axes lying in the floorplan so that horizontal cartesian axes are orthogonal to a vertical cartesian axis; and
select one of the angles and rotate the mesh by a negative of the angle so as to form a re-oriented mesh.

8. The system of any of the examples 5-7, further comprising the one or more programs rectifying the mesh so that the walls in the scan are indicated as being linear or planar.

9. The system of example 8, wherein the one or more programs rectify by:

identifying four walls of a room in the scan using the re-oriented mesh;

projecting the vertices of the re-oriented mesh representing the walls onto a plane parallel to the floorplan so as to form projections and using a fitting algorithm so as to form the projections into lines representing each of the walls, wherein the lines intersect to form a quadrilateral; and transforming the quadrilateral into a right angle quadrilateral such that the lines intersect at 90 degrees.

10. The system of any of the examples 7-9, further comprising the one or more programs registering the re-oriented mesh with the floorplan, comprising determining a registration transformation function that rotates and scales the right angle quadrilateral so that the right angle quadrilateral correctly superimposes on the segments tracing the corresponding walls in the floorplan.

11. The system of any of the examples 5-10, further comprising the one or more programs indicating objects identified in the mesh on the floorplan.

12. The system of example 11, wherein the indicating comprises:

generating superpixels corresponding to connected sets of facets on the mesh with similar orientation, so that the superpixels each represent a planar surface patch; and highlighting the superpixels selected by the user as identifying the object.

13. The system of any of the examples 1-12, wherein the one or more programs (or the one or more provide one or more tools allowing a user to):

annotate the map with one or more meaningful labels that are translatable to one or more glanceable visual signals or audio signals in response to activation by a user.

In one or more examples, the labels each comprise a point or point feature created (e.g., by a user clicking, pointing, or touching) anywhere on the map. The location of this point or point feature on the map is recorded along with one or more features such as a sign or a sound signal. Example signs include a name designating the presence and location of an object in a room, e.g., table, printer, cabinet, refrigerator, trash can, or whiteboard, or places such as a restroom sign (women or men), exit (e.g., emergency exit), entrance, or signs indicating directions to one or more destinations or lobbies (e.g., in a museum). In other examples, the point may correspond to the presence of a visible sign in the sign, or a sound-emitting source such as an emergency sound speaker. When a subsequent user selects the point on the map (e.g., by touching or clicking on the point on the map on a display), the sign becomes visible on the map and/or the device displaying the map emits a sound.

In one or more examples, the map is annotated with one or more labels created by a first user (e.g., creator) selecting a feature on the map and associating, mapping or corresponding the feature to a presence of a visible sign or a sound emitting source at a location identified in the map. The label translates into or outputs at least one of a glanceable visual signal or an audio signal in response to activation by a second user navigating using the map. The activation may comprise clicking or touching the label comprising the point feature on the map.

The present disclosure further describes a method and system for diagraming a space (e.g., interior space, plaza, or facility) with annotations or decorations including meaningful labels (such as rooms, entrances, windows, atriums). In one or more examples, the annotations or decorations are translatable to glanceable visual signals or audio signals.

The present disclosure further describes a method and system for partitioning a map, diagram or layout of an interior space so as to create the useable additions or annotations to the map, diagram, or layout.

In one or more examples, the map, diagram, or layout can be annotated with navigation information, e.g., from a database, that helps a user navigate within the space. In one or more embodiments, the database is populated with crowdsource data obtained using crowdsourcing.

Examples of spaces include, but are not limited to, interior or exterior spaces of businesses, residences or homes, public buildings, universities, plazas (e.g., medical or shopping plazas), or other facilities. In other examples, the spaces comprise gas stations or roads. In one or more examples, the maps, diagrams, layouts, and databases with navigation information or annotations are public and/or accessible/downloadable from a website.

BRIEF DESCRIPTION OF THE DRAWINGS

Referring now to the drawings in which like reference numbers represent corresponding parts throughout:

FIG. 8A illustrates an example of conversion from SIM to GeoJSON. A room, described by one row in the sim file, is represented as a Feature in GeoJSON

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

FIRST EXAMPLE

Figure 1:
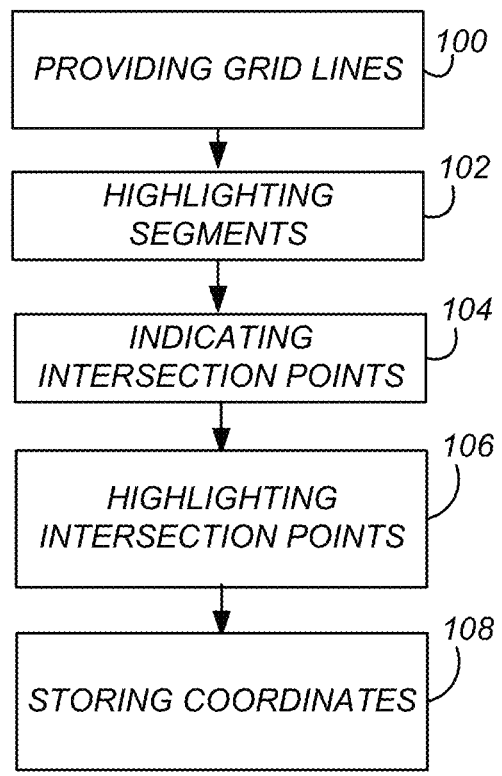
FIG. 1 illustrates a computer implemented method for generating floorplan coordinates of an interior scene.

Computer Implemented Method for Generating Floorplan Coordinates of an Interior Scene FIG. 1 is a flowchart illustrating a computer implemented method for generating floorplan coordinates of an interior (e.g., indoor) scene or space. The method comprises the following steps.

Block 100 represents providing a set of grid lines on a floor plan of the interior scene.

Block 102 represents highlighting segments of the grid lines selected by a user, each of the segments tracing a wall on the floorplan so that the segment is colinear with the wall.

Block 104 represents indicating intersection points between the segments;

Block 106 represents highlighting the intersection points comprising corner intersection points between adjacent walls.

Block 108 represents storing the corner points as the floorplan coordinates in a database or list.

The method can be implemented in a variety of ways including, but not limited to, the following.

1. A computer implemented method, comprising: generating floorplan coordinates of an interior scene, by:
providing a set of grid lines on a floor plan of the interior scene;
highlighting segments of the grid lines selected by a user, each of the segments tracing a wall on the floorplan so that the segment is colinear with the wall;
indicating intersection points between the segments;
highlighting the intersection points comprising corner intersection points between adjacent walls; and
storing the corner points as the floorplan coordinates in a database or list.

2. The method of embodiment 1, further comprising converting the coordinates into GeoJSON format.

3. The method of embodiment 1 or 2, further comprising converting the floorplan coordinates, wherein the converting comprises:
obtaining geodetic coordinates of exterior corners of exterior walls on the floorplan;
obtaining the floorplan coordinates of the exterior corners;
determining a transformation function that transforms the geodetic coordinates of the exterior corners to the floorplan coordinates of the exterior walls; and
converting all the corner points in the floorplan coordinates into the geodetic coordinates using the transformation function.

4. The method of embodiments 1-3, further comprising:
obtaining a scan of objects in one or more rooms mapped using the floorplan, wherein the scan identifies the objects using a mesh; and
orienting the mesh with the floorplan.

Examples of a scan include, but are not limited to, any image or data containing or representing (e.g., spatial) information about the objects. Examples include, but are not limited to, a two dimensional scan, a three dimensional scan, a point by point scan, a point cloud, or any digital or data representation of an image of the scene obtained by scanning the object or capturing an image (or spatial information) of the object with an imaging device, e.g., camera or scanner.

5. The method of embodiment 4, wherein the orienting comprises orienting the mesh so that a wall of a room identified using the mesh is aligned with a cartesian axis of the floorplan coordinates.

6. The method of embodiments 4 or 5, wherein the orienting comprises:
selecting all vertices in the mesh whose normal vector is approximately orthogonal to a vertical cartesian axis orthogonal to the floorplan;
computing one or more angles between one or more of the normal vectors and one of the horizontal cartesian axes lying in the floorplan (horizontal cartesian axes orthogonal to the vertical cartesian axis); and
selecting one of the angles and rotating the whole mesh by the negative of the angle.

7. The method of embodiments 4-6, further comprising rectifying the mesh so that walls in the scan are indicated as being linear or planar.

8. The method of embodiment 7, wherein the rectifying comprises:
identifying four walls of a room in the scan using the re-oriented mesh;
projecting the vertices of the re-oriented mesh representing the walls onto a plane parallel to the floorplan so as to form projections and using a fitting algorithm so as to form the projections into lines representing each of the walls, wherein the lines intersect to form a quadrilateral;

transforming the quadrilateral into a right angle quadrilateral such that the lines intersect at 90 degrees (e.g., using collineation).

9. The method of embodiment 8, further comprising registering the re-oriented mesh with the floorplan, comprising determining a registration transformation function that rotates and scales the right angle quadrilateral so that the right angle quadrilateral correctly superimposes on the segments tracing the corresponding walls in the floorplan.

10. The method of embodiments 4-9, further comprising indicating objects identified in the mesh on the floorplan.

11. The method of embodiment 10, wherein the indicating comprises:

generating superpixels (e.g., a group of pixels sharing common characteristics) corresponding to connected sets of facets on the mesh with similar orientation, so that the superpixels each represent a planar surface patch; and highlighting the superpixels selected by the user as identifying the object.

The method of any of the preceding embodiments 1-10, wherein the interior scene includes an interior view of a business, residence, public building, university, plaza, or shopping mall.

SECOND EXAMPLE

Computer Implemented Method for Diagraming a Space

Figure 2:
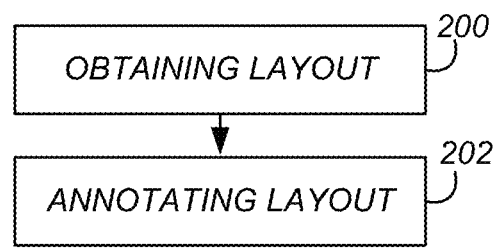
FIG. 2 illustrates a computer implemented method for diagraming a space.

FIG. 2 is a flowchart illustrating a method and system for diagraming a space (e.g., interior space, plaza, or facility), comprising obtaining a layout of the space (Block 200) and annotating the layout (Block 202) with meaningful labels (such as names, rooms, entrances, windows, atriums). In one or more examples, the annotations or decorations are translatable to glanceable visual signals or audio signals.

Embodiments described herein further describe partitioning a map, diagram or layout of an interior space so as to create the useable addition or annotation to the map, diagram, or layout.

In various examples, the map, diagram, or layout can be annotated with navigation information, e.g., from a database, that helps a user navigate within the space. In one or more embodiments, the database is populated with crowdsource data obtained using crowdsourcing.

Examples of spaces include, but are not limited to, interior or exterior spaces of businesses, residences or homes, public buildings, universities, plazas (e.g., medical or shopping plazas), transit hubs, or other facilities. In other examples, the spaces comprise gas stations or roads. In one or more examples, the maps, diagrams, layouts, and databases with navigation information or annotations are public (e.g., a public layout or diagram) and/or accessible/downloadable from a website.

The computer implemented method can be embodied in many ways including, but not limited to, the following.

12. A computer implemented method for diagraming a space, comprising:

obtaining a layout of the space; and annotating or decorating the layout with one or more meaningful labels that are translatable to one or more (e.g., glanceable) visual or visible signals one or more audio signals (e.g. in response to activation or selection by a user selecting the label on the map). In one or more examples, the visible signals are visible by persons with poor eyesight or visually impaired.

13. The method of claim 12, wherein the labels each comprise a point created by a user clicking, pointing, or touching anywhere on the map. The location of this point is recorded along with several features such as a sign or a noise. Example signs include a name designating a place, such as restroom sign (women or men), exit (e.g., emergency exit), entrance, an exhibition room, a whiteboard, or signs indicating directions to one or more destinations or lobbies (e.g., in a museum). In other examples, the point may correspond to the presence of a sound-emitting source such as an emergency sound speaker. When a user selects the point on the map (e.g., by touching or clicking on the point on the map on a display), the sign becomes visible on the map and/or the device displaying the map emits a sound.

14. The method of embodiment 12 or 13, wherein the label identifies a room, a lobby, an entrance, a windows, center court, or an atrium.

15. The method of embodiment 12, 13, or 14, further comprising:

partitioning the layout of the space so as to create the labels comprising navigation information useful for navigating within the space.

16. The method of any of the embodiments 12-15, further comprising obtaining the navigation information from a database populated using crowdsourcing.

17. The method of any of the preceding embodiments 12-16, wherein the space includes an interior or exterior space of a business, residence, public building, university, or plaza.

18. The method of any of the preceding embodiments 12-17, wherein the layout comprises the floorplan of any of the claims 1-10 annotated using the floorplan coordinates and/or mesh.

19. The method of any of the preceding claims 1-18, further comprising displaying the layout or the floorplan on a display.

THIRD EXAMPLE

Hardware Environment

Figure 3A:
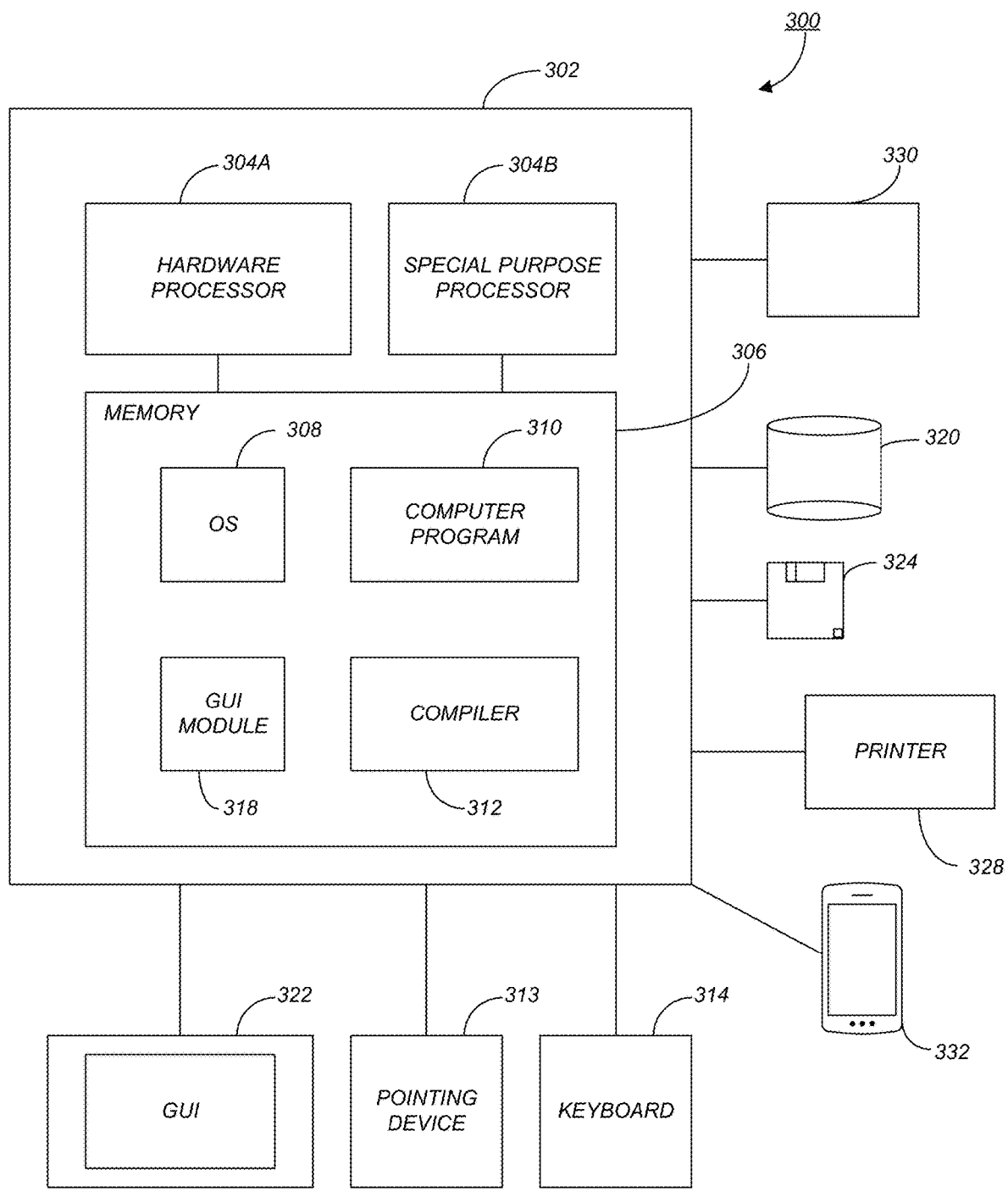
FIG. 3A illustrates a hardware environment for implementing the methods described herein.

FIG. 3A is an exemplary hardware and software environment 300 (referred to as a computer-implemented system and/or computer-implemented method) used to implement one or more embodiments of the invention. The hardware and software environment includes a computer 302 and may include peripherals. Computer 302 may be a user/client computer, server computer, or may be a database computer. The computer 302 comprises a hardware processor 304A and/or a special purpose hardware processor 304B (hereinafter alternatively collectively referred to as processor 304) and a memory 306, such as random access memory (RAM). The computer 302 may be coupled to, and/or integrated with, other devices, including input/output (I/O) devices such as a keyboard 314, a cursor control device 316 (e.g., a mouse, a pointing device, pen and tablet, touch screen, multi-touch device, etc.) and a printer 328. In one or more embodiments, computer 302 may be coupled to, or may comprise, a portable or media viewing/listening device 332 (e.g., an MP3 player, IPOD, NOOK, portable digital video player, cellular device, personal digital assistant, etc.). In yet another embodiment, the computer 302 may comprise a multi-touch device, mobile phone, gaming system, internet enabled television, television set top box, or other internet enabled device executing on various platforms and operating systems.

In one embodiment, the computer 302 operates by the hardware processor 304A performing instructions defined by the computer program 310 under control of an operating system 308. The computer program 310 and/or the operating system 308 may be stored in the memory 306 and may interface with the user and/or other devices to accept input and commands and, based on such input and commands and the instructions defined by the computer program 310 and operating system 308, to provide output and results.

Output/results may be presented on the display 322 or provided to another device for presentation or further processing or action. In one embodiment, the display 322 comprises a liquid crystal display (LCD) having a plurality of separately addressable liquid crystals. Alternatively, the display 322 may comprise a light emitting diode (LED) display having clusters of red, green and blue diodes driven together to form full-color pixels. Each liquid crystal or pixel of the display 322 changes to an opaque or translucent state to form a part of the image on the display in response to the data or information generated by the processor 304 from the application of the instructions of the computer program 310 and/or operating system 308 to the input and commands. The image may be provided through a graphical user interface (GUI) module 318. Although the GUI module 318 is depicted as a separate module, the instructions performing the GUI functions can be resident or distributed in the operating system 308, the computer program 310, or implemented with special purpose memory and processors.

In one or more embodiments, the display 322 is integrated with/into the computer 302 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITHC, PLAYSTATION PORTABLE, etc.), touch tables, and walls (e.g., where an image is projected through acrylic and/or glass, and the image is then backlit with LEDs).

Some or all of the operations performed by the computer 302 according to the computer program 310 instructions may be implemented in a special purpose processor 304B. In this embodiment, some or all of the computer program 310 instructions may be implemented via firmware instructions stored in a read only memory (ROM), a programmable read only memory (PROM) or flash memory within the special purpose processor 304B or in memory 306. The special purpose processor 304B may also be hardwired through circuit design to perform some or all of the operations to implement the present invention. Further, the special purpose processor 304B may be a hybrid processor, which includes dedicated circuitry for performing a subset of functions, and other circuits for performing more general functions such as responding to computer program 310 instructions. In one embodiment, the special purpose processor 304B is an application specific integrated circuit (ASIC).

The computer 302 may also implement a compiler 312 that allows an application or computer program 310 written in a programming language such as C, C++, Assembly, SQL, PYTHON, PROLOG, MATLAB, RUBY, RAILS, HASKELL, or other language to be translated into processor 304 readable code. Alternatively, the compiler 312 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 310 accesses and manipulates data accepted from I/O devices and stored in the memory 306 of the computer 302 using the relationships and logic that were generated using the compiler 312.

The computer 302 also optionally comprises an external communication device such as a modem, satellite link, Ethernet card, or other device for accepting input from, and providing output to, other computers 302.

In one embodiment, instructions implementing the operating system 308, the computer program 310, and the compiler 312 are tangibly embodied in a non-transitory computer-readable medium, e.g., data storage device 320, which could include one or more fixed or removable data storage devices, such as a zip drive, floppy disc drive 324, hard drive, CD-ROM drive, tape drive, etc. Further, the operating system 308 and the computer program 310 are comprised of computer program 310 instructions which, when accessed, read and executed by the computer 302, cause the computer 302 to perform the steps necessary to implement and/or use the present invention or to load the program of instructions into a memory 306, thus creating a special purpose data structure causing the computer 302 to operate as a specially programmed computer executing the method steps described herein. Computer program 310 and/or operating instructions may also be tangibly embodied in memory 306 and/or data communications devices 330, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 302.

Figure 3B:
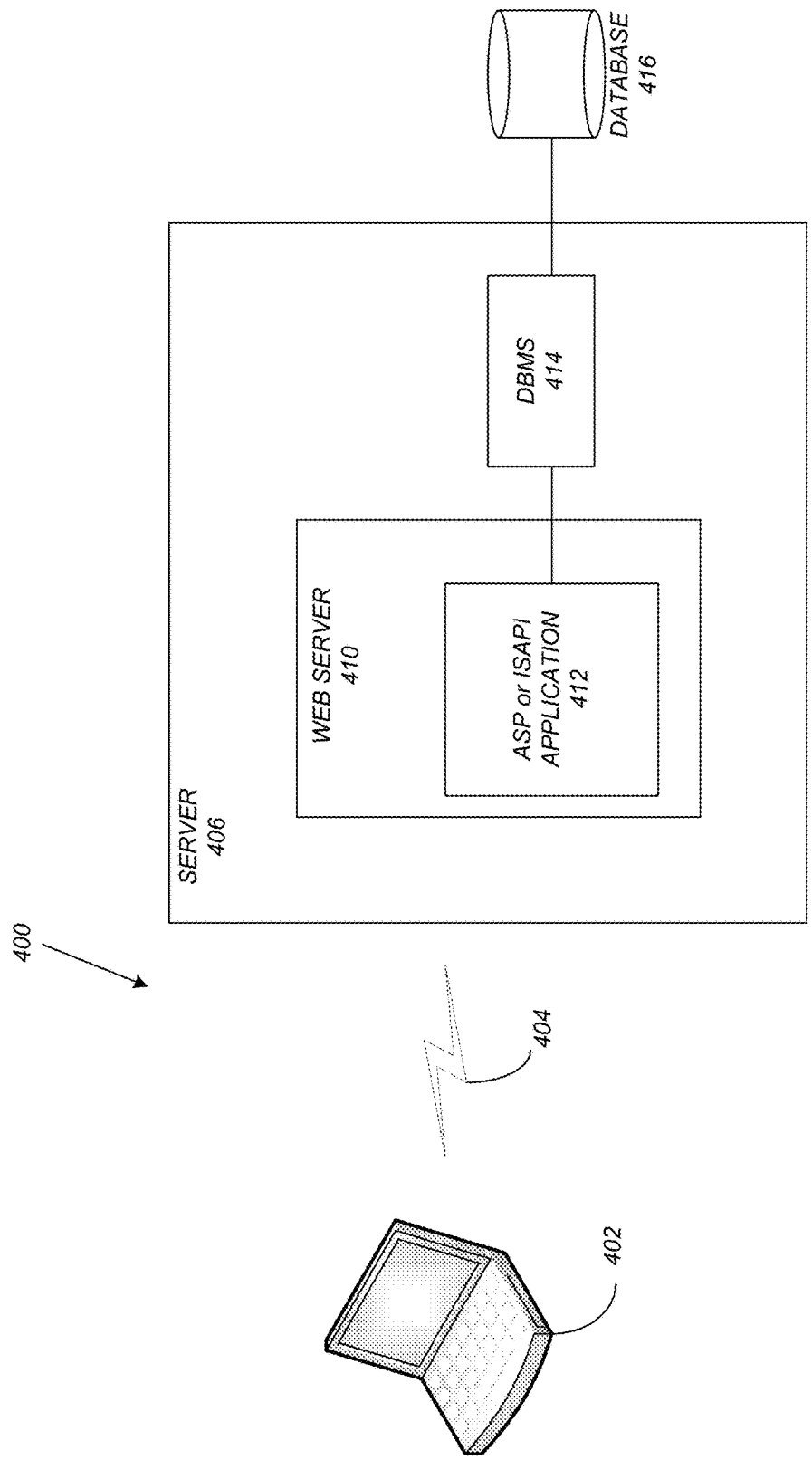
FIG. 3B illustrates a network environment for implementing the methods described herein.
Figure 4:
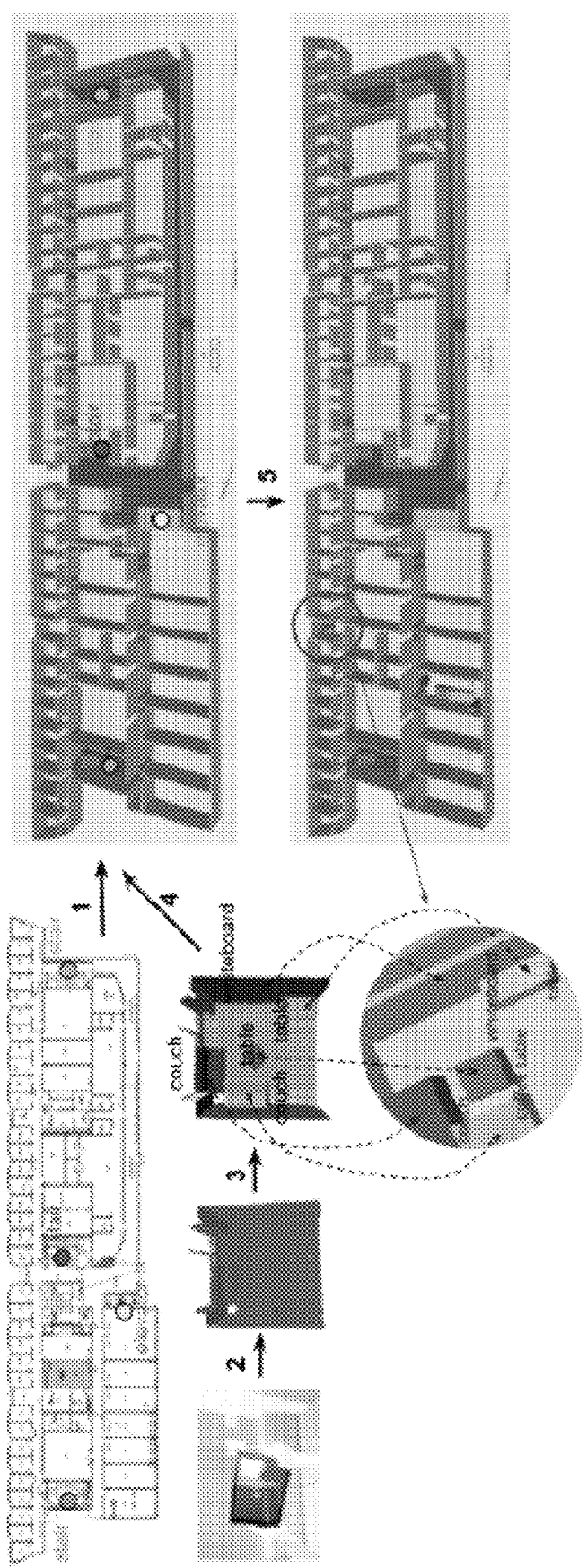
FIG. 4 illustrates the SIM toolbox workflow. (1) A floor plan is manually traced and visualized as an extruded 3D object on Open-StreetMap, with some of its fixtures labeled. (2) A room is scanned with an RGB-D sensor. (3) Objects of interest, such as furnitures, are segmented using a semi-automatic process. (4) The 3D room scan is registered with the floor plan, and (5) objects are automatically inserted in the map at the correct locations.

FIG. 3B schematically illustrates a typical distributed/cloud-based computer system 400 using a network 404 to connect client computers 402 to server computers 406. A typical combination of resources may include a network 404 comprising the Internet, LANs (local area networks), WANs (wide area networks), SNA (systems network architecture) networks, or the like, clients 402 that are personal computers or workstations (as set forth in FIG. 3A), and servers 406 that are personal computers, workstations, minicomputers, or mainframes (as set forth in FIG. 3A). However, it may be noted that different networks such as a cellular network (e.g., GSM [global system for mobile communications] or otherwise), a satellite based network, or any other type of network may be used to connect clients 402 and servers 406 in accordance with embodiments of the invention.

A network 404 such as the Internet connects clients 402 to server computers 406. Network 404 may utilize ethernet, coaxial cable, wireless communications, radio frequency (RF), etc. to connect and provide the communication between clients 402 and servers 406. Further, in a cloud-based computing system, resources (e.g., storage, processors, applications, memory, infrastructure, etc.) in clients 402 and server computers 406 may be shared by clients 402, server computers 406, and users across one or more networks. Resources may be shared by multiple users and can be dynamically reallocated per demand. In this regard, cloud computing may be referred to as a model for enabling access to a shared pool of configurable computing resources.

Clients 402 may execute a client application or web browser and communicate with server computers 406 executing web servers 410. Such a web browser is typically a program such as MICROSOFT INTERNET EXPLORER/ EDGE, MOZILLA FIREFOX, OPERA, APPLE SAFARI, GOOGLE CHROME, etc. Further, the software executing on clients 402 may be downloaded from server computer 406 to client computers 402 and installed as a plug-in or ACTIVEX control of a web browser. Accordingly, clients 402 may utilize ACTIVEX components/component object model (COM) or distributed COM (DCOM) components to provide a user interface on a display of client 402. The web server 410 is typically a program such as MICROSOFT'S INTERNET INFORMATION SERVER.

Web server 410 may host an Active Server Page (ASP) or Internet Server Application Programming Interface (ISAPI) application 412, which may be executing scripts. The scripts invoke objects that execute business logic (referred to as business objects). The business objects then manipulate data in database 416 through a database management system (DBMS) 414. Alternatively, database 416 may be part of, or connected directly to, client 402 instead of communicating/ obtaining the information from database 416 across network 404. When a developer encapsulates the business functionality into objects, the system may be referred to as a component object model (COM) system. Accordingly, the scripts executing on web server 410 (and/or application 412) invoke COM objects that implement the business logic. Further, server 406 may utilize MICROSOFT'S TRANSACTION SERVER (MTS) to access required data stored in database 416 via an interface such as ADO (Active Data Objects), OLE DB (Object Linking and Embedding DataBase), or ODBC (Open DataBase Connectivity).

Generally, these components 400-416 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 402 and 406 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 402 and 406. Embodiments of the invention are implemented as a software/application on a client 302 or server computer 406. Further, as described above, the client 302 or server computer 406 may comprise a thin client device or a portable device that has a multi-touch-based display.

One more embodiments may use Application Programming Interfaces (APIs) such as, but not limited to, Google Maps JavaScript API, Google Maps Directions API, Google Maps Distance Matrix API, and Google Maps Roads API.

In one or more examples, the web application is developed in Flask and the client application runs on iOS.

Software Embodiment Overview

Embodiments of the invention are implemented as a software application on a client 402 or server computer 406. Further, as described above, the client 402 or server computer 406 may comprise a thin client device or a portable device that has a multi-touch-based display.

FOURTH EXAMPLE

SIM Toolbox a. Introduction

Interactive 3D visualization of building interiors provides enhanced experience of spatial exploration with respect to traditional, static maps. Using tools such as MapboxGL JavaScript API1, 3D pop-up environments can be easily rendered on top of generic 2D maps from web applications such as Google Maps or OpenStreetMap. This type of 3D rendering may afford more intuitive and engaging access to complex building layouts, and may enable inter-active features such as displaying a selected floor of a building, or activating different groups of features or detail levels.

In order to display building interiors by means of 3D interactive tools, it is first necessary to convert available spatial data into an appropriate vectorized format. While most modern building have detailed CAD floor plans (e.g. in dwg or dwf format), this data is nor mally not accessible to the mapper. By and large, floor plans, when they are available, are only accessible in image (e.g., JPEG) or PDF format. Computer vision algorithms for the automatic conversion into vectorized form of images of floor plans have been demonstrated, but due to the wide variety of graphical representations used to draw the floor plans, these algorithms are not universally applicable. And while companies such Google and Apple are actively acquiring digital representation of interiors of public spaces, and some of these are already available for visualization in their map applications, this data is proprietary and not available to the public.

It is also important to observe that floor plans typically contain information only at the level of walls and openings (such as doors). Rarely do they represent smaller-scale features such as fixtures or furniture. Yet, when available, these features could make for a richer visualization, and could convey useful spatial information. An example is given in the the lower right panel of FIG. 5, wherein three rooms have been populated with items such as tables, couches, and file folders, which have been correctly geo-registered with the building.

This article introduces Semantic Interior Mapology (SIM), a toolbox with two main components: (1) The Map Conversion toolkit, which is designed to easily convert floor plans into a digital format amenable to interactive visualization; (2) The Map Population toolkit, which allows one to add small-scale items that were not present in the original floor plan (see FIG. 14). More specifically:

The Map Conversion toolkit is a JavaScript web application with an intuitive interface. It allows one to quickly and accurately trace a floor plan from an image of it, generating a vectorized map. Complex building layouts, like the one shown in FIG. 14, can be traced in just a few minutes. A "semantic" representation of the building layout is saved in a intermediate file format called sim, which can then be easily converted into other formats (e.g. GeoJSON, KML, IndoorGML). The Map Population toolkit starts from a 3D scan of an environment (e.g., a room). A semi-automatic procedure enables segmentation of the visible surfaces into objects of interests (such as furnitures). This spatial data is then geo-registered with the GeoJSON representation of the same environment (as generated by the Map Conversion toolkit), and used to "populate" the map by adding the desired items in the same GeoJSON file. 3D scans can be obtained using off-the-shelf RGB-D cameras and stitching software, such as Occipital's Structure Sensor2.

To render a floor plan's 3D map view, we employ the MapboxGL JS engine, a location data platform. Geodetic features (stored in a GeoJSON file) are shown as extruded 3D objects on OpenStreetMap, which can be accessed and interacted with from a regular web browser.

Figure 5:
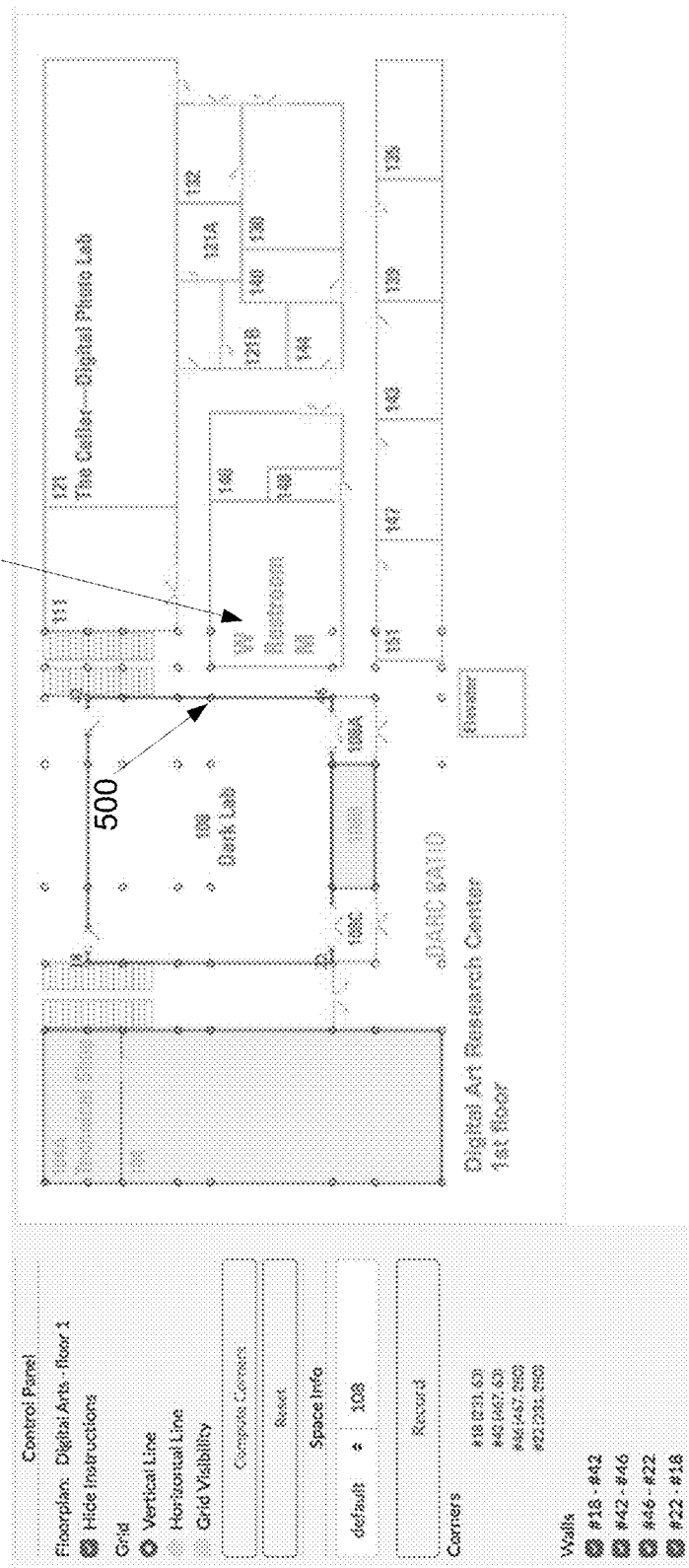
FIG. 5 illustrates the toolkit GUI includes a control panel and a canvas. Possible wall corners (line intersections) are rendered as blue circles. Actual wall corners (line intersections) are rendered as red circles. Red segments represent wall segments. Gaps with endpoints marked by a green x denote entrances within wall segments. Yellow polygons with blue border show spaces for which tracing was completed. Gaps in a blue border represent entrances to the space.

Works in the analysis of floor plans focused on the interac-tive conversion of a 2D raster image into a 3D model [1][2]. The ScanPlan project [3] used the Hough transform for the detection of plan from an image of it. Our tracing interface exploits the fact that most floor plans have straight walls that intersect at 90 degrees, meaning that most walls can only have one of two orientations. Note that the toolkit also supports less common situations with walls at arbitrary orientation (e.g. FIG. 7(*a*)). The floor plan should be oriented such that the main wall orientations are parallel to the screen axes (FIG. 5).

Rather than tracing wall segments by selecting endpoints (as with other web applications such as Google My Maps or Mapbox Studio), Map Conversion lets the user define a grid of horizontal and vertical lines, where each line overlaps with a segment in the floor plan representing a wall. The user simply Shift-clicks on a segment to generate a line with the desired orientation. Note that, in typical layouts, the same line may contain multiple disjoint wall segments that happen to be co-planar. This strategy is very convenient in the case of repetitive layouts, as it reduces the number of required input selections, and ensures that co-planar walls are traced by segments that are correctly aligned with each other. In the case of diagonal (but still planar) wall segments, the user should add two properly oriented "ghost walls" lines, crossing an actual wall segment at the desired corner (i.e., at an endpoint of the diagonal wall segment). Non-planar walls are not currently supported by the toolkit. Lines can be added with simple Shift-clicks, and removed (in the case of a mistake) with a Alt/Cmd-click.

Once all visible wall segments have been covered by lines, the user may click on the Compute Corners button. This triggers computation and display (in the form of small blue circles) of all line intersections (the lines are automatically removed from display at this point). Each intersection is assigned a numerical ID. Some (but not all) of these intersections correspond to physical wall corners. The next step is for the user to (1) select which ones of the intersections do correspond to wall corner, (2) select whether two nearby corners are joined by a wall, and (2) associate walls to individual spaces (rooms or open areas such as corridors or halls). Note that complex spaces can be conveniently subdivided into smaller spaces (segments) as shown in FIG. 7(*c*).

The corner selection/association step is accomplished as follows. Each space is visited in turn. At each space, the user clicks on the line intersections that correspond to wall corners within that space. The color of the small circles at the selected intersections turns red, and the associated IDs are displayed on the map. These wall corners are sorted in clockwise order, and listed in the side panel of the interface. In addition, all possible walls joining adjacent corners are also listed in the same side panel. For example, in FIG. 6(*d*), after the user selects corners #18, #22, #42, #46, they are ordered as (#18, #42, #46, #22), and all possible walls connecting adjacent corner pairs are displayed. These are: (#18, #42), (#42, #46), (#46, #22), and (#22, #18) (not shown in the figure due to space limitation) The user then simply clicks on the corner pairs that correspond to actual walls, which are then displayed as red segments. In this case, the room has a closed contour (except for door openings), hence all corner pairs are selected.

Figure 7:
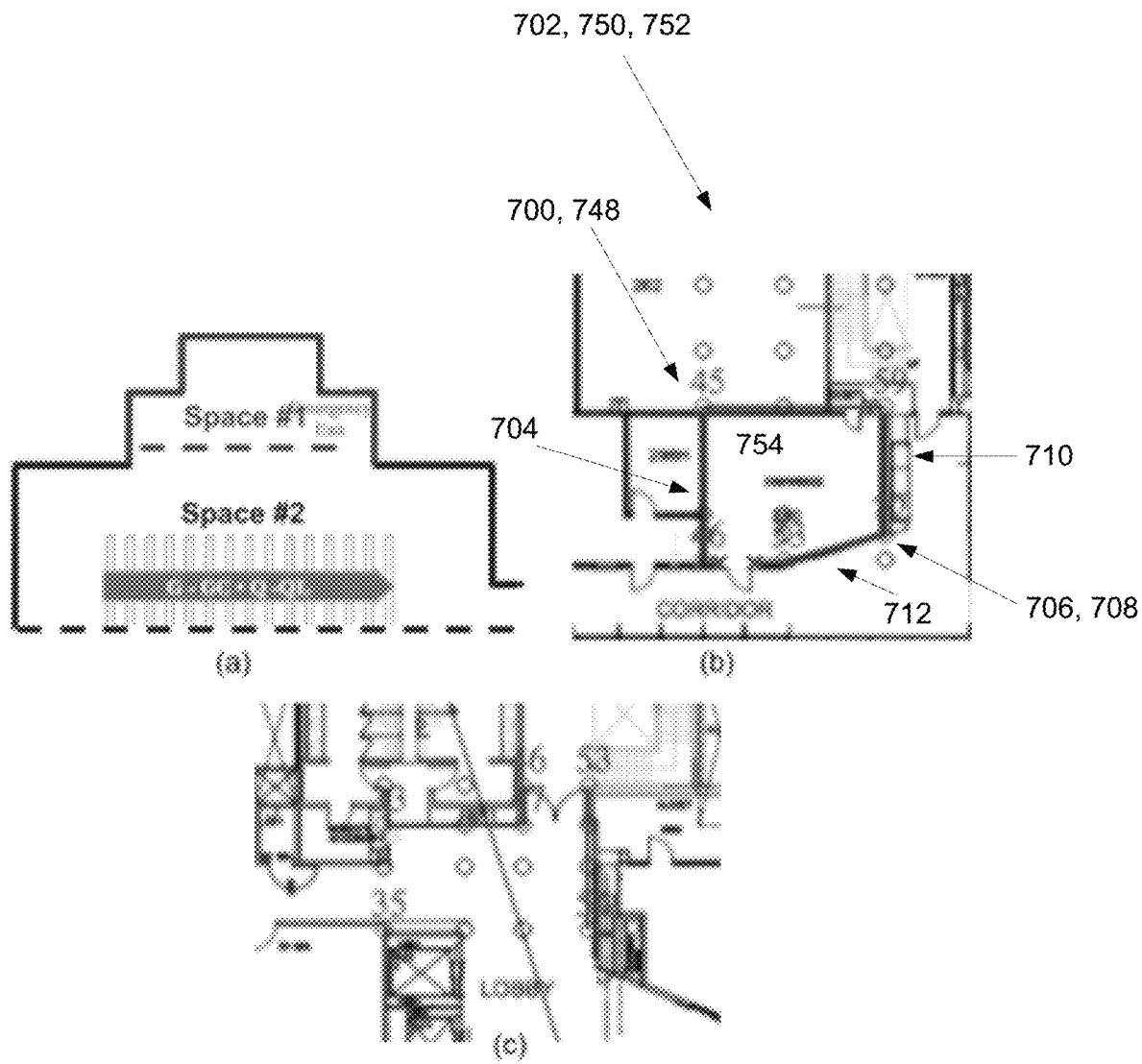
FIG. 7: (a) An example of a traced room with a diagonal wall. (b) Tracing a "segment" of an open space. Note that several wall corners are not linked by walls. (c) A complex space can be divided into multiple spaces ("segments") to facilitate tracing.

As another example, consider the open space ('LOBBY') shown in FIG. 7(*b*). Its fairly complex layout is divided into a number of smaller spaces, one of which is defined by the wall corners (#33, #47, #46, #53, #56, #35). Only the following corner pairs are joined by a wall: (#33, #47), (#47,#46), (#53,#56). Note that the remaining corner pairs ((#46, #53), (#56, #35), (#35, #33)) are not selected, signifying that the space between them is open.

An example with a diagonal wall is shown in FIG. 7(*a*). Note that corners #32 and #53 were generated as the intersections of proper wall lines (i.e., lines containing actual wall segments) with "ghost wall" lines, as explained above. For example, a horizontal ghost wall line was defined (by a Shift-click on the map) to intersect the vertical wall line at #32.

In order to trace an entrance door to a room, the user first defines the whole wall containing the door as described above (as opposed, for example, to defining two wall segments at either side of the door). Once the wall segment has been determined, one can define the endpoints of the the door segment in the map, by Shift-clicking on the appropriate locations on the wall segment. For example, in FIG. 6(*f*), the user specified two entrances along the wall connecting the corner pair (#18, #42), as well as two entrances along the wall of (#46, #22). Two corners are automatically generated and stored in a list (separate from the wall corners list), and a new entity ("entrance") is defined, joining the two corners.

The user concludes the task of tracing a space by providing its name (e.g., a room number), and by selecting the space type from a pull-down menu. The current list of space types includes: room (default), corridor, restroom, staircase, elevator.

b. Spatial Features Representation

The floor plan tracing process described above produces spatial information hierarchically organized in terms of spaces, with each space characterized by a set of wall corners and possibly entrance corners, where pairs of adjacent wall corners may or may not be joined by a wall. We store this information in a sim file.

The sim format is inspired by the Polygon File Format (PLY), which is used to represent 3D objects as lists of flat polygons. A PLY file contains a list of vertices and a list of polygons, where each polygon is defined as an ordered list of vertex IDs. A sim file contains a list of wall corners and a list of entrance corners. Each space is assigned a list of wall corner IDs and a (possibly empty) list of entrance corner IDs. Additionally, sim allows one to specify whether two wall corners in the list should be connected by a wall, or not connected (implying an empty space between these corners).

Each space is represented in the following format: {id name type num_corner corner_indices wall_info entrance_info}. For example, {s2217 room 5 1 3 27 19 12 1 1 1 1 0 e2 3 1 2} means that the space's ID is s2, its name is 217, it is a room, and it has 5 corners whose indices, sorted in clockwise order, are (#1, #3, #27, #19, #12). The next sequence of num_corner=5 binary values 1111 0 indicates that there are walls connecting the corner pairs (#1, #3), (#3, #27), (#27, #19), and (#19, #12); but there is no connection for (#12, #1). The last sequence with three entries (e2 3 1 2) denotes that there is an entrance with an identifier of e2 along the wall with index 3 (i.e., the third wall in the list: (#27, #19). The endpoints of this entrance are (#1, #2), where these IDs refer to the list of entrance corners. Additional entrances to the same space would be listed as additional quadruplets of entries at the end of the list. Note that wall corners and wall segments can be re-used for different adjacent spaces.

c. Conversion to GeoJSON.

Figure 8A:
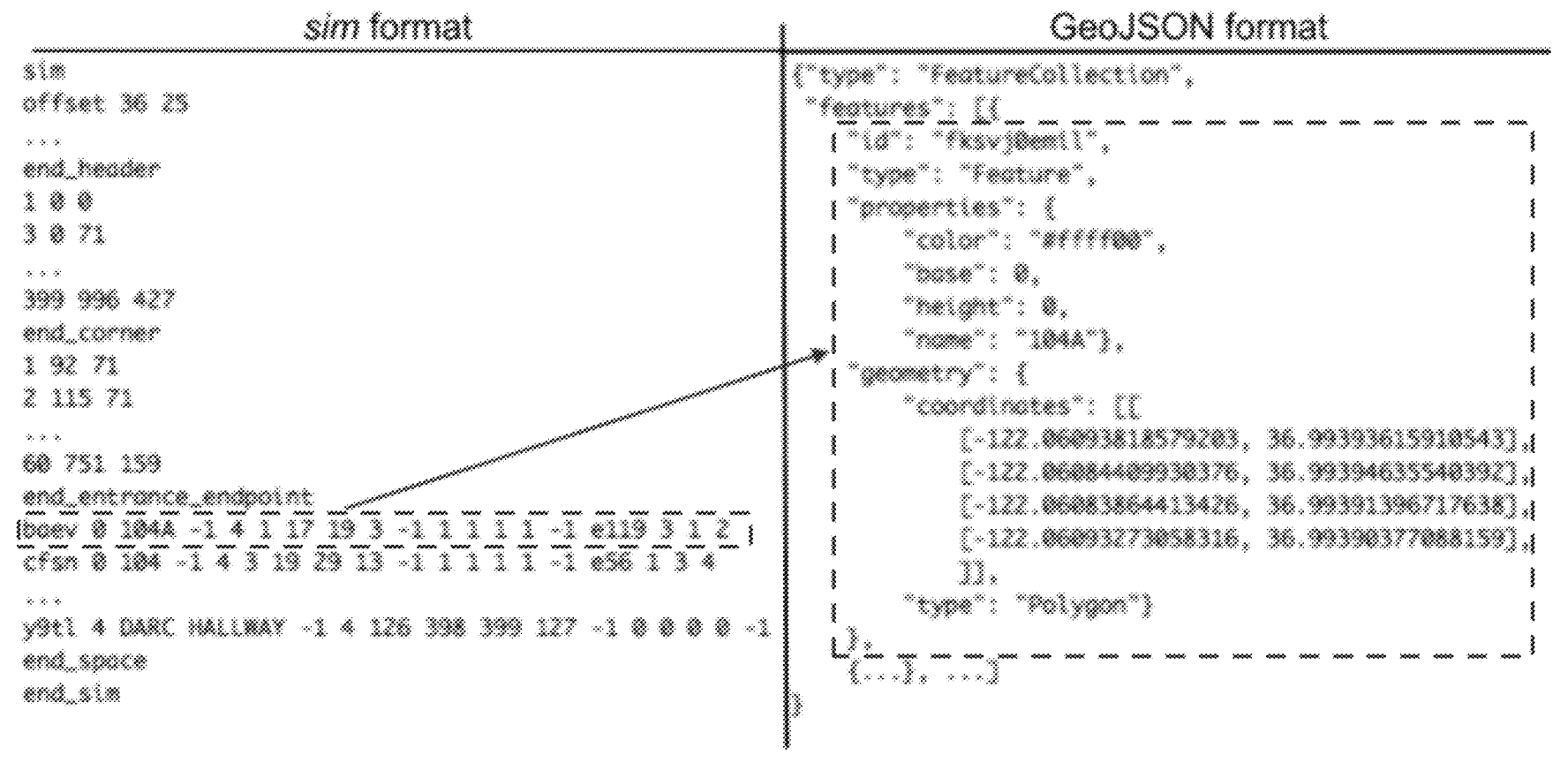

A sim file can be easily converted into other formats. The Map Conversion toolkit contains a converter into GeoJSON, a popular format for representing spatial information [18]. The GeoJSON format defines simple geometric primitives such as Point, LineString, and Polygon. The MapboxGL JS engine renders a 3D map view by extruding GeoJSON features representing segmented spaces or annotated objects. These features consist of a set of properties represented as a (key, value) mapping and a geographical geometry represented as a polygon. A feature's properties include name, encoded color, height, and distance from the ground level. The geometry information contains the coordi-nates (lat, long) of the polygon's vertices. Multiple features are hierarchically grouped into a Feature Collection object. The Geo-JSON generator in the Map Conversion toolkit generates Feature Collection objects automatically from the sim structures. Similarly, annotated objects (Sec. 3.2) are represented as cuboids. FIG. 8A shows an example of conversion from sim space and GeoJSON Feature Collection.

d. Geo-Registration

Corner points in sim are defined in terms of (x,y) screen coordinates. Conversion to (lat,long) geodetic coordinates for GeoJSON representation is performed as follows. We first determine the geodetic coordinates of at least four corners, chosen from the building's external walls. This is easy to do if, for example, the contour of the building under consideration is visible in a web application such as Google Map or Apple Maps, and the location of the selected corners can be identified in this contour (note that these applications return the WGS84 geodetic coordinates of selected locations). The geodetic coordinates of these points are then converted to Universal Transverse Mercator (UTM) coordi-nates using standard formulas. The UTM system is based on a conformal projection, and thus produces little distortion for small areas. Next, we determine a collineation (homographic) transformation between the (x,y) screen coordi-nates of the wall corners and the UTM coordinates of the same points. The collineation matrix can be found using Direct Linear Transformation [ ]. The same collineation is then used to transform the (x,y) coordinates of all remaining corners into UTM coordinates, which are then converted into geodetic coordinates.

Figure 8B:
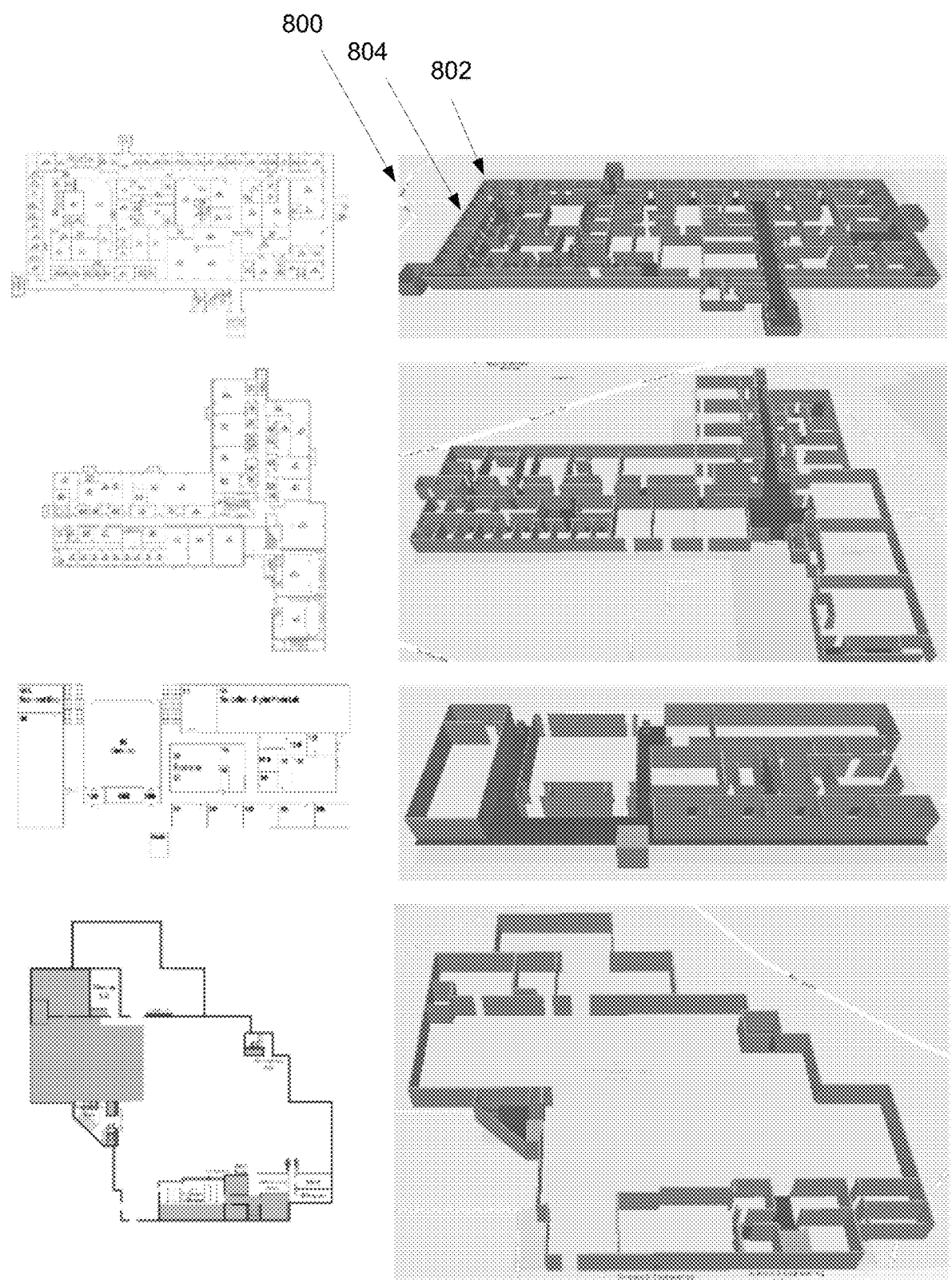
FIG. 8B illustrates examples of application of our Map Conversion toolkit.

Some examples of end-to-end conversion from floor plan image to GeoJSON file, shown as pop-up over OpenStreetMap using the MapboxGL JS engine, are presented in FIG. 8B. Note that in the con-version from sim to GeoJSON, staircases have been represented as three adjacent rectangles of different heights, colored in green, while elevators are shown colored in blue.

Figure 9:
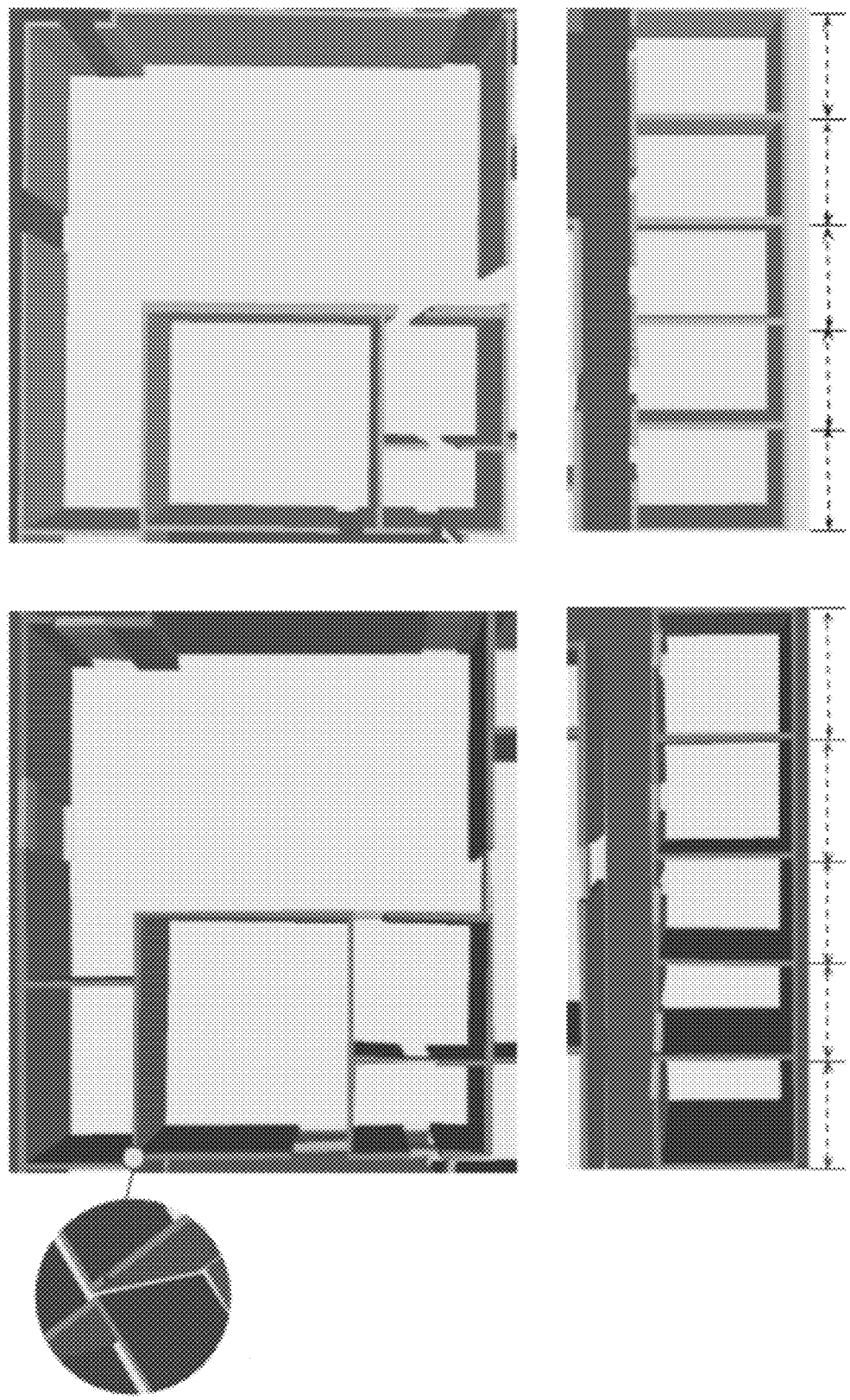
FIG. 9 illustrates the same floor plan extracted and saved as a GeoJSON file using Mapbox Studio (left) and our Map Conversion toolkit (right FIG. 10A illustrates an example of re-orientation. The top row of FIG. 10A has the original shape, with a representation of the faces' normals. After re-orientation, the longest segment is aligned with the Z axis.

Some advantages of using our Map Conversion toolkit as compared to other web-based drawing interfaces are highlighted in FIG. 9, which compares the results using MapBox Studio (left) and our Map Conversion toolkit (right). Mapbox studio, like other drawing inter-faces such as Google Map, doesn't allow one to trace a floor plan image. Individual walls need to be copied by hand, often resulting in geometric errors such as incorrect spacing or orientations. In addition, when shapes are drawn individually by hand, connectivity errors may occur (see inset of FIG. 9). Our strategy of first defining a line grid, then selecting corners from the line intersections, ensures that co-planar walls are represented by collinear segments, and that connected wall corners remain connected.

e. Map Population Toolkit

The Map Population toolkit allows one to insert 3D objects, such as furnitures, into a GeoJSON map. Objects are extracted from a 3D scan of the environment, and represented as boxes. We use Occipital's Structure sensor, which has a RGB-D camera and software for registration and stitching of multiple 3D point clouds into one mesh, stored in a PLY file. The workflow is organized in a sequence of stages (orientation, rectification/rescaling, segmentation), as de-scribed next. We will assume that a room with four walls has been scanned in its entirety; the same mechanism can be extended to the case of partial scans, or for different types of spaces (e.g., corridors).

f. Mesh Orientation

Our first step is to orient the mesh acquired by the 3D scanner with the floor plan. The Structure sensor produces a mesh with its Y axis vertical (as measured by the sensor's accelerometer), but with arbitrary orientation of the X-Y plane. We would like to re-orient the mesh (rotate it around the Y axis) such that the walls of the room are aligned with the X and Z axes. (These axes will then be mapped to the x-y axes of the 2D floor plan). We firs select all vertices in the mesh whose normal vector is approximately orthogonal to the Y axis (i.e., corresponding to vertical surface elements). For each such vertex, we compute the angle formed by its normal and the Z axis. Peaks in the histogram of these angles reveal the orientation of the main walls. For example, in the case shown in FIG. 10(b), a peak is found at 127°, corresponding to the orientation of the longer walls. The whole mesh is then re-oriented by rotation around the Y axis by the opposite angle.

g. Mesh Rectification/Rescaling

Figure 10A:
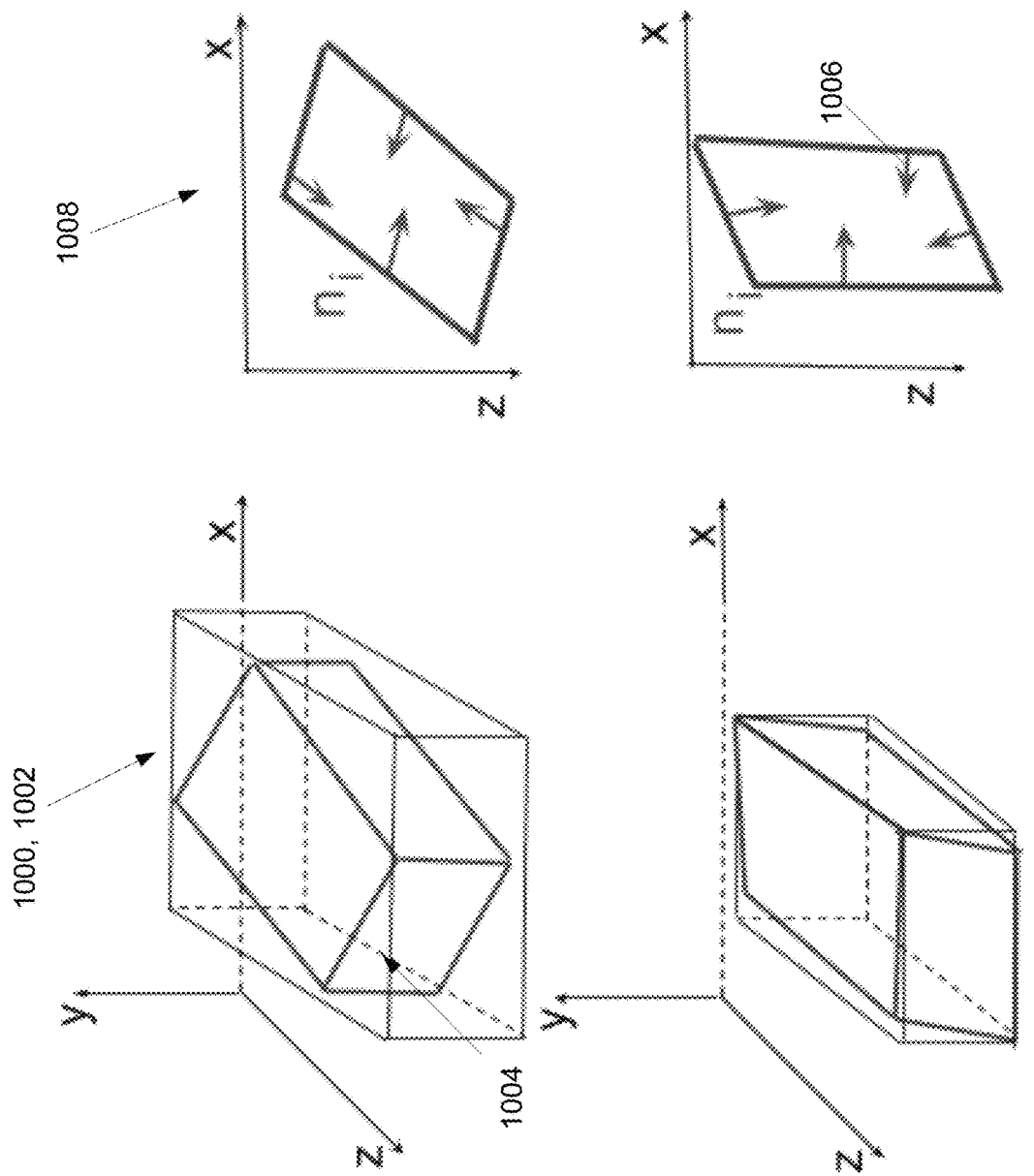
FIG. 10B shows the histogram of the angles between surface normals and Z axis.
Figure 10B:
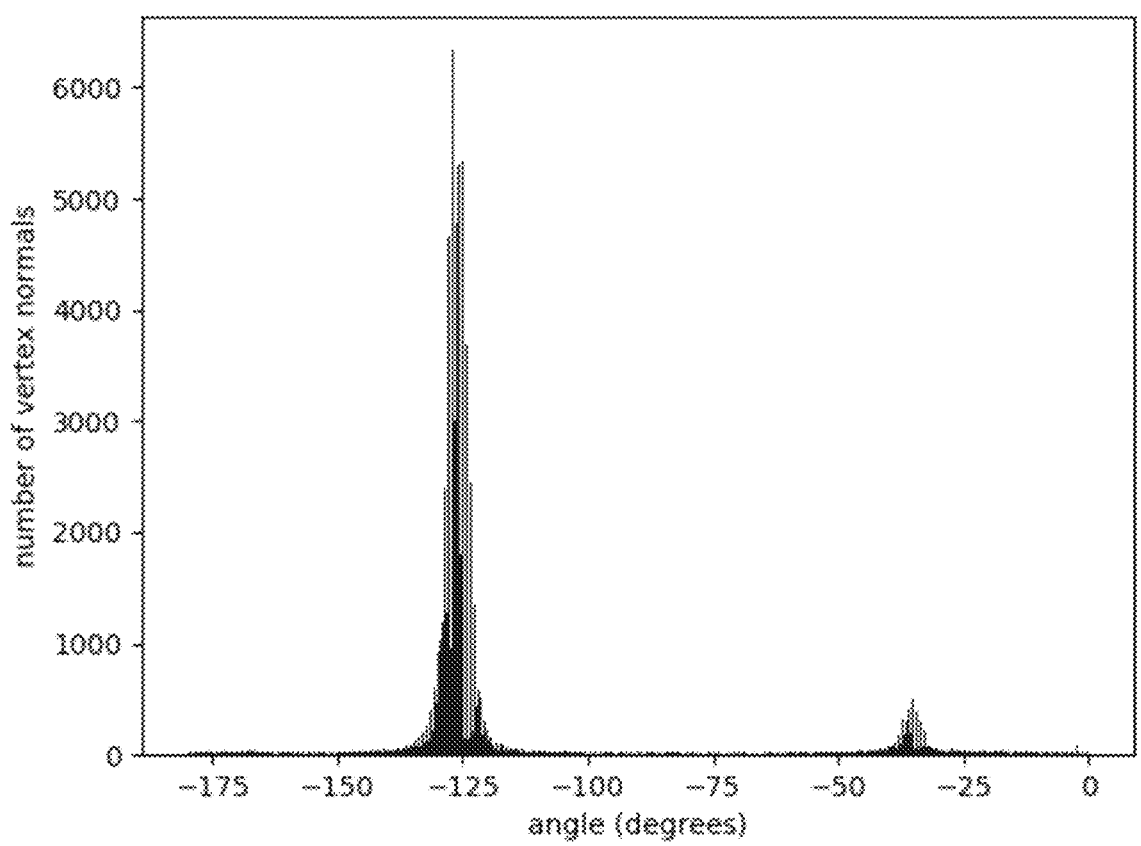
Figure 11:
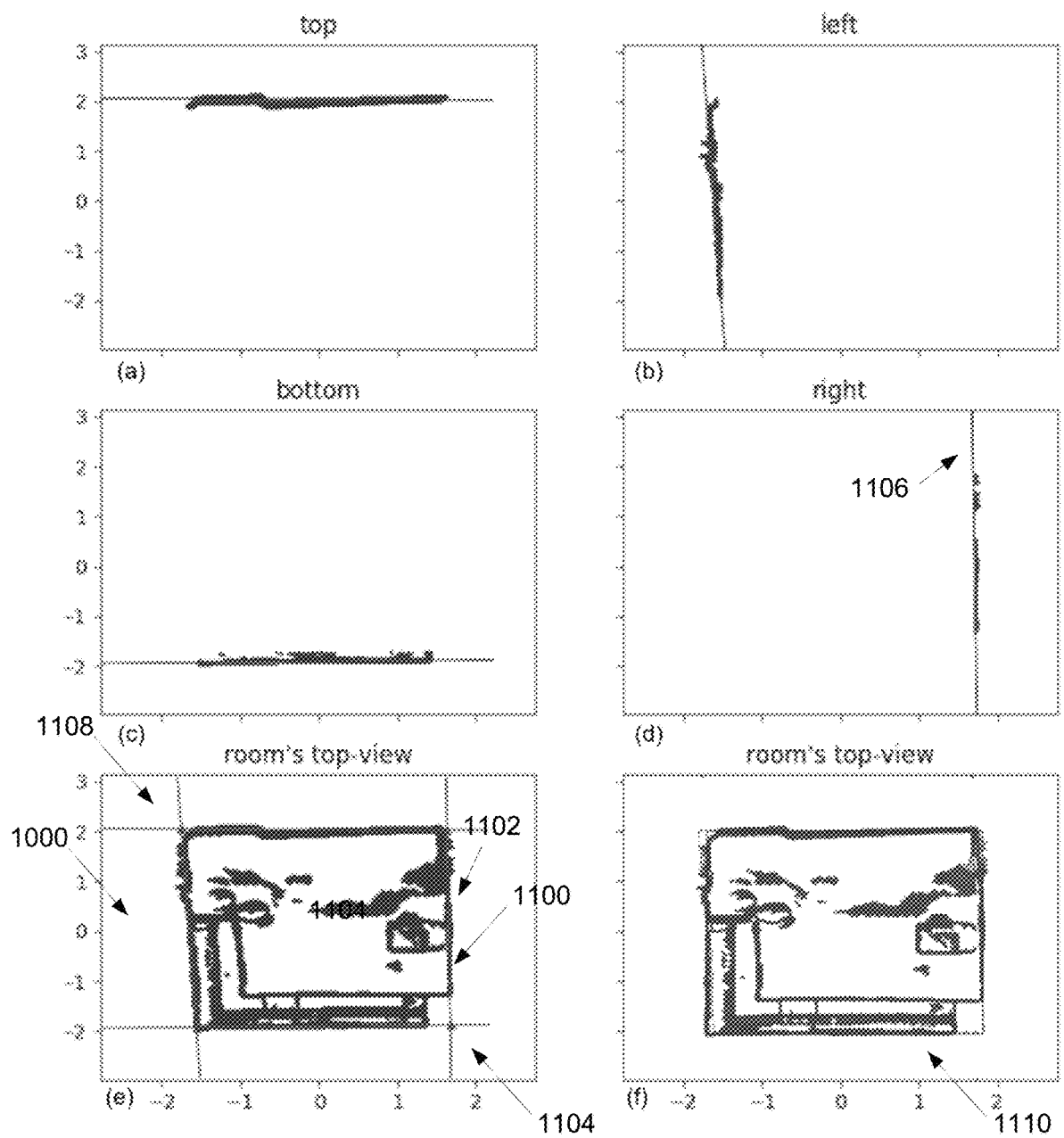
FIG. 11 illustrates individual walls are identified by linear fitting of the vertices of the re-oriented mesh, projected onto the X-Z plane. The resulting quadrilateral is transformed into the best-fitting axis-parallel rectangle, and the same transformation is applied to the (X,Z) coordinates of all vertices in the mesh.

Due to errors in data acquisition, registration or stitching, the geometry of 3D scans of environments is often inaccurate. In particular, wall scans are sometimes not planar, or walls appear not to intersect at 90°. This may affect the registration of the environment with the floor plan. We correct for global errors using the following simple procedure. We first identify the four walls in the acquired mesh. To do this, we project the vertices of the reoriented mesh onto the X-Z plane (FIG. 11, bottom left). We then select the vertices with Z coordinate in the top quartile, and run the RANSAC algorithm [ ] to find a robust line fitting (FIG. 10, top left). This line represents the top wall. We repeat the same procedure for all sides, resulting in four lines in the X-Z plane. An example of the result is shown in FIG. 11, bottom left. From this figure, it is clear that, due to artifacts of scanning, the walls do not appear to intersect at 90°. We then find the axis-parallel rectangular box that best approximates the quadrilateral formed by the line intersections. The collineation (homography) that brings this quadrilateral's vertices into the corners of this axis-parallel rectangle is computed. The mesh can this be rectified by applying the same collineation to the (X,Z) coordinates of all vertices in the mesh.

In order to register the resulting mesh with the floor plan, we first visually determine the correct orientation of the mesh. Remember from the previous section that our re-orientation procedure aligns the longer walls with the Z axis. However, this may not be the actual orientation of the space in the floor plan, and an additional rotation by 90° or 180° may be required. Finally, we find the offset between the (x,y) coordinates of one corner of the room in the floor plan, and the (X,Z) coordinates of the corresponding corner of the rectangular bounding box, as well as the two scale factors that ensure that the box correctly fits the room in the floor plan.

h. Object Segmentation

Figure 12:
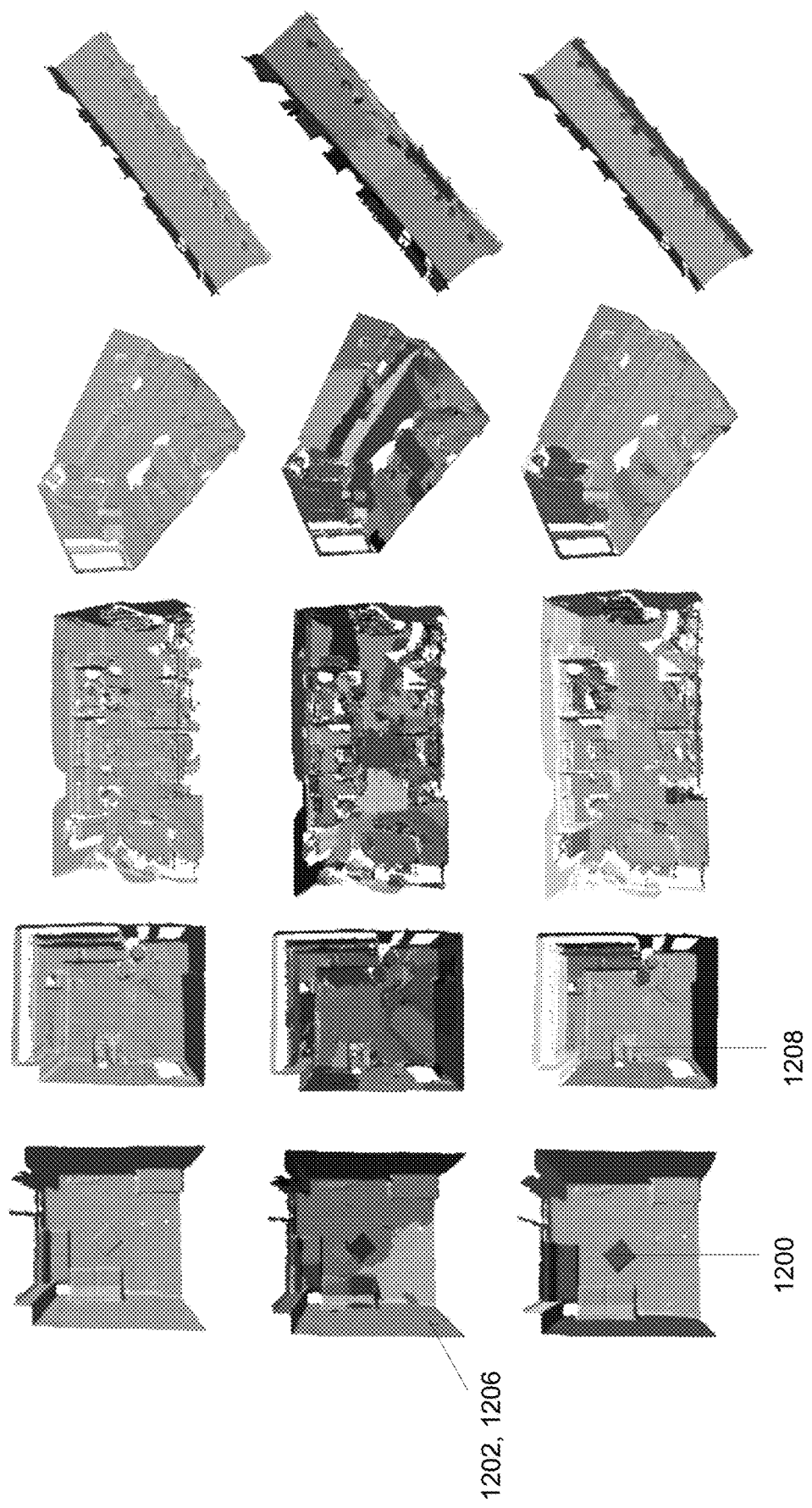
FIG. 12 illustrates top row: 3D scans of indoor environments using Occipital's Structure sensor. Center row: automatic super-pixelation of the meshes using the algorithm of [1]. Bottom row: segmentation of individual objects using the web toolkit described in [2].

The final goal of the Map Population toolkit is to extract objects of interest from the 3D scan, correctly dimensioned and registered with the floor plan, and insert them (in the form of cuboids placed on the ground) in the GeoJSON represen-tation of the floor plan. We employ the following semi-automatic procedure for the task of segmenting objects of interest from the re-oriented and rectified mesh. First, we use the algorithm described in [19] to generate "super-pixels", which in this case correspond to connected sets of mesh facets with similar orientation. A super-pixel thus represent an approximately planar surface patch. We then use the web-based toolkit described in [20] to manually select all super-pixels corresponding to each identified object. Examples of automatic super-pixelation and manual segmentation (assignment of super-pixels to individual objects) are shown in FIG. 12.

Figure 13:
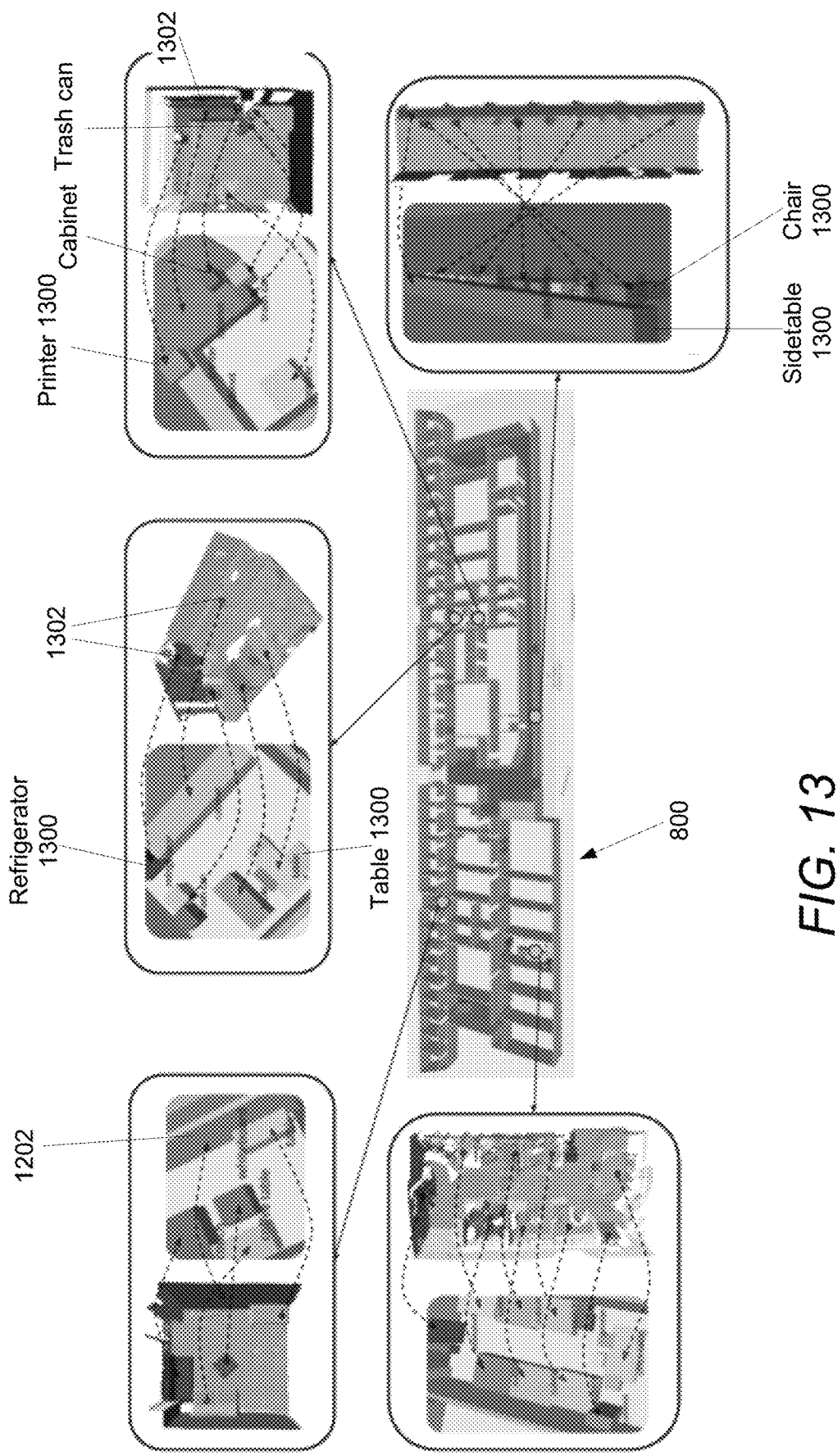
FIG.13 illustrates the bounding boxes of individually segmented objects (left insets) are placed in the GeoJSON file containing the building's floor plan (right insets). The whole building with its objects is displayed over OpenStreetMap.

Finally, for each selected object, we compute the bounding box of the associated sub-mesh, and assign it a name and a color for display. Since the mesh was already correctly registered with the floor plan, adding the spatial description of this bounding box to the same GeoJSON file is trivial. Some examples of map population with individual objects are shown in FIG. 13.

We have presented SIM, a toolbox for the generation of vectorized representation of floor plans and of room content. The Map Conver-sion toolkit allows one to quickly and accurately trace the layout of a floor plan, generating a geo-registered GeoJSON file that canbe visualized interactively. The Map Population toolbox allows one to "populate" spaces with objects such as furnitures. Rather than manually measuring the size and location of these objects, the user can simply take a 3D scan with a RGB-D camera. Using the toolkit, one can easily segment out individual objects from the 3D scan. The 3D mesh is rectified and registered with its representation in the GeoJSON file, and the objects are automatically placed in their correct location in the map.

Example Embodiments

The methods and systems described herein can be embodied in many ways including, but not limited to, the following.

Figure 6:
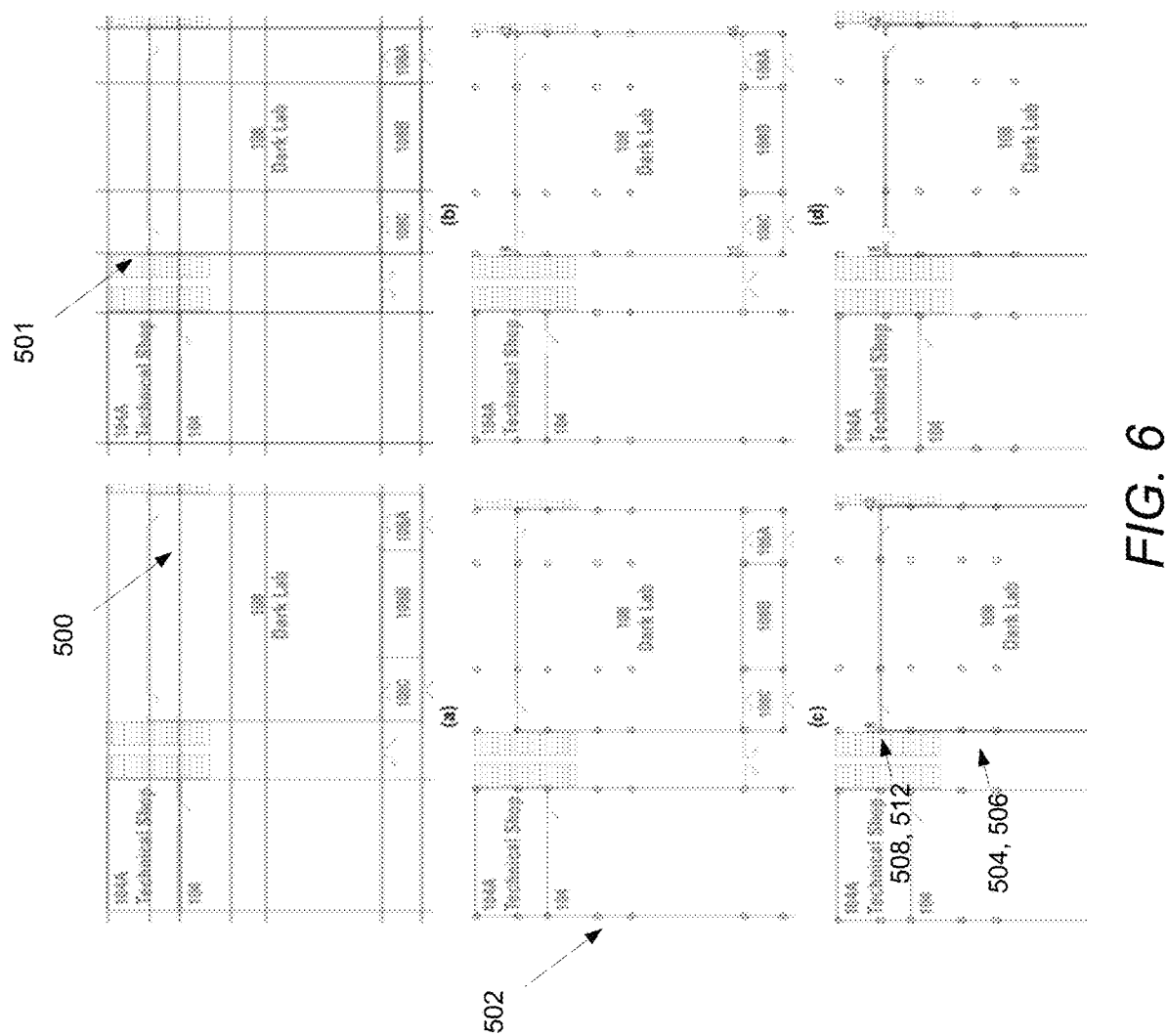
FIG. 6 illustrates a Map Conversion workflow. (a) First, horizontal grid lines are generated via Shift-clicks. (b) Vertical grid lines are generated next. (c) All line intersections (possible wall corners) are automatically computed and displayed.(d) The user selects corners #18, #22, #42, #46 for the boundary of a space (Room 108). (e) The user then selects the walls connecting the corner pairs (#18, #42), (#42, #46), (#46, #22), and (#22, #18). (f) Finally, the user defines two entrances along the wall of (#18, #42) and two entrances along the wall of (#46, #22).

1. FIGS. 5-7 illustrate a computer implemented method, comprising: generating floorplan coordinates 700 of an interior scene 702, by:

providing a set 501 of grid lines 500 on a floor plan 502 of the interior scene;

highlighting 504 segments 506 of the grid lines selected by a user, each of the segments tracing a wall 704 on the floor plan so that the segment is colinear with the wall;

indicating 508 intersection points 512 between the segments;

highlighting 706 the intersection points 708 comprising corner intersection points 516 between the walls comprising adjacent walls 710, 712; and storing the corner intersection points as the floorplan coordinates in a database or list.

2. FIGS. 8-9 illustrates the method of example 1 further comprising converting the coordinates into GeoJSON format.

3. The method of examples 1 or 2, further comprising converting the floorplan coordinates, wherein the converting comprises:

obtaining geodetic coordinates of exterior corners of exterior walls on the floorplan;

obtaining the floorplan coordinates of the exterior corners;

determining a transformation function that transforms the geodetic coordinates of the exterior corners to the floorplan coordinates of the exterior walls; and converting all the corner points in the floorplan coordinates into the geodetic coordinates using the transformation function.

4. FIGS. 10-11 further illustrates the method of any of the examples 1-3, further comprising:

obtaining a scan 1000 of objects 1002 in one or more rooms 1100 mapped using the floorplan, wherein the scan identifies the objects using a mesh 1004; and orienting the mesh with the floorplan.

5. FIGS. 10-11 further illustrates the method of example 4, wherein the orienting comprises orienting the mesh so that a wall 1102 of a room 1100 identified using the mesh 1004 is aligned with a cartesian axis of the floorplan coordinates.

6. FIGS. 10-11 further illustrate the method of examples 4 or 5, wherein the orienting comprises:

selecting all vertices in the mesh whose normal vector 1006 is approximately orthogonal to a vertical cartesian axis 1008 orthogonal to the floorplan;

computing one or more angles between one or more of the normal vectors and one of the horizontal cartesian axes lying in the floorplan (horizontal cartesian axes orthogonal to the vertical cartesian axis); and selecting one of the angles and rotating the whole mesh by the negative of the angle.

7. FIG. 11 further illustrates the method of any of the examples 4-6, further comprising rectifying the mesh so that walls in the scan are indicated as being linear or planar.

8. FIG. 11 further illustrates method of example 7, wherein the rectifying comprises:

identifying four walls 1102 of a room 1100 in the scan using the re-oriented mesh 1104;

projecting the vertices of the re-oriented mesh representing the walls onto a plane parallel to the floorplan so as to form projections and using a fitting algorithm so as to form the projections into lines 1106 representing each of the walls, wherein the lines intersect to form a quadrilateral 1108;

transforming the quadrilateral into a right angle quadrilateral 1110 such that the lines intersect at 90 degrees (e.g., using collineation).

9. The method of example 8, further comprising registering the re-oriented mesh with the floorplan, comprising determining a registration transformation function that rotates and scales the right angle quadrilateral so that the right angle quadrilateral correctly superimposes on the segments tracing the corresponding walls in the floorplan.

10. FIG. 12 illustrates the method of any of the examples 4-9, further comprising indicating objects 1200 identified in the mesh on the floorplan.

11. FIG. 12 illustrates the method of example 10, wherein the indicating comprises:

generating superpixels 1202 corresponding to connected sets of facets 1204 on the mesh with similar orientation, so that the superpixels each represent a planar surface patch 1206; and highlighting 1208 the superpixels selected by the user as identifying the object. 12.

12. FIG. 12 further illustrates a computer implemented method for diagraming a space, comprising:

obtaining a layout 1210 of the space 1212; and annotating 1214 or decorating 1214 the layout with meaningful labels that are translatable to glanceable visual signals or audio signals.

13. The method of example 12, wherein the label identifies a room, a lobby, an entrance, a windows, center court, or an atrium.

14. The method of example 12 or 13, further comprising:

partitioning the layout of the space so as to create the labels comprising navigation information useful for navigating within the space.

15. The method of any of the examples 12-14, further comprising obtaining the navigation information from a database populated using crowdsourcing.

16. The method of any of the examples 12-15, wherein the space includes an interior or exterior space of a business, residence, public building, university, or plaza.

17. The method of any of any of the examples 12-16, wherein the layout comprises the floorplan of any of the claims 1-10 annotated using the floorplan coordinates and/or mesh.

18. The method of any of the examples 1-18, wherein the interior scene includes an interior view of a business, residence, public building, university, plaza, or shopping mall.

19. The method of any of the examples 1-17, further comprising displaying the layout or the floorplan on a display.

20. A computer implemented system, comprising:

FIGS. 3-11 illustrate one or more processors; one or more memories; and one or more programs 310 (e.g., one or more tools or applications) stored in the one or more memories, wherein the one or more programs or applications executed by the one or more processors:

receive a floorplan 502 of a scene 702;

provide one or more tools (e.g. grid lines 500, segments 506) for tracing 748 a layout 750 of the floorplan 502 so as to generate an annotated floorplan 752;

generate a map 800 representing the annotated floorplan in two dimensions or three dimensions (e.g., geoJSON file);

receive one or more scans 1000 of one or more objects 1002 in a space 754 in the floorplan;

associate the scan(s) with the annotated floorplan, or register floorplan coordinates 700 of the annotated floor plan with scan coordinates of the scan(s) so as to populate the map 800 with the object(s) 1002 correctly positioned (and/or dimensioned) in/on the map 800.

21. The computer implemented system of example 20, wherein the one or more programs:

generate the floorplan coordinates of the scene 702, by:

providing a set 501 of grid lines 500 on the floor plan of the scene;

highlighting 504 segments 506 of the grid lines selected by a user, each of the segments tracing a wall 704 on the floorplan so that the segment is colinear with the wall;

indicating 508 intersection points 708 between the segments;

highlighting 706 the intersection points comprising corner intersection points between adjacent walls 701, 712; and storing the corner points as the floorplan coordinates in a database or list.

22. The system of examples 21 or 22, further comprising converting the floorplan coordinates into GeoJSON format.

23. The system of examples 21 or 22, wherein the one or more programs generate the map 800 by converting the floorplan coordinates, wherein the converting comprises the one or more programs:

obtaining geodetic coordinates of exterior corners 802 of exterior walls 804 on the floorplan;

obtaining the floorplan coordinates of the exterior corners 802;

determining a transformation function that transforms the geodetic coordinates of the exterior corners to the floorplan coordinates of the exterior walls; and converting all the corner points in the floorplan coordinates into the geodetic coordinates using the transformation function.

24. The system of any of the examples 20-23, wherein the one or more programs:

obtain the scan 1000 of the object 1002 (e.g., table) in a room 1100 of the scene 702 comprising an interior scene mapped using the floorplan, wherein the scan identifies the object using a mesh 1004; and orient the mesh with the floorplan.

25. The system of example 24, wherein the one or more programs orient the mesh so that a wall of the room identified using the mesh is aligned with a cartesian axis 1008 of the floorplan coordinates.

26. The system of example 25, wherein the one or more programs:

select all vertices in the mesh whose normal vector is approximately orthogonal to a vertical cartesian axis 1008 orthogonal to the floorplan;

compute one or more angles between one or more of the normal vectors and one of the horizontal cartesian axes lying in the floorplan so that horizontal cartesian axes are orthogonal to a vertical cartesian axis; and select one of the angles and rotate the mesh by a negative of the angle so as to form a re-oriented mesh.

27. The system of any of the examples 24-26, further comprising the one or more programs rectifying the mesh so that the walls in the scan are indicated as being linear or planar.

28. The system of example 27, wherein the one or more programs rectify by:

identifying four walls 1102 of a room 1100 in the scan using the re-oriented mesh;

projecting the vertices of the re-oriented mesh representing the walls onto a plane parallel to the floorplan so as to form projections and using a fitting algorithm so as to form the projections into lines 1106 representing each of the walls, wherein the lines intersect to form a quadrilateral 1108; and transforming the quadrilateral into a right angle quadrilateral 1110 such that the lines intersect at 90 degrees.

29. The system of any of the examples 24-28, further comprising the one or more programs registering the re-oriented mesh with the floorplan, comprising determining a registration transformation function that rotates and scales the right angle quadrilateral so that the right angle quadrilateral correctly superimposes on the segments tracing the corresponding walls in the floorplan.

30. The system of any of the examples 24-29, further comprising the one or more programs indicating objects 1200 identified in the mesh on the floorplan.

31. The system of example 30, wherein the indicating comprises:

generating superpixels 1202 corresponding to connected sets of facets on the mesh with similar orientation, so that the superpixels each represent a planar surface patch; and highlighting the superpixels selected by the user as identifying the object.

32. FIG. 5 and FIG. 13 illustrate the system of any of the examples 1-31, wherein the one or more programs diagram the map 800 by (or provide tool(s) allowing a user or creator user to):

annotating or decorating the map with meaningful labels 1302 that are translatable to glanceable visual signals or audio signals in response to a user selecting the label on the map.

The user can create the label comprising a "point" or point feature 1302 by clicking anywhere in the map 800 on the display. The location of this point on the map is recorded by the computer system along with several features. For example, the point or point feature may correspond to the presence of a visible sign in the sign, a sound-emitting source such as an emergency sound speaker. Examples of visible signs or visual signals 1300 include, but are not limited to, signs indicating the presence of objects or furniture such as "table," "printer," "cabinet," "refrigerator," "trash can," or "whiteboard," in a room, or places such as restroom signs (women W or men M), exit (e.g., emergency exit), entrance, or signs indicating directions to one or more destinations or lobbies (e.g., in a museum).

In one or more examples, the map is annotated with one or more labels created by a first user (e.g., creator) selecting a feature on the map and associating, mapping or corresponding the feature to a presence of a visible sign or a sound emitting source at a location identified in the map. The label translates into or outputs at least one of a glanceable visual signal or an audio signal in response to activation by a second user navigating using the map. The activation may comprise clicking or touching the label comprising the point feature on the map.

33. The system of claim 32, wherein the label identifies a room, a lobby, an entrance, a windows, center court, or an atrium and the scene comprises an interior or exterior space of a business, residence, public building, university, or plaza.

34. The system of claim 32 or 33, further comprising the one or more programs: partitioning the layout of the space so as to create the labels comprising navigation information useful for navigating within the space.

35. The system of any of the examples 32-34, further comprising the one or more programs obtaining the navigation information from a database populated using crowd-sourcing.

36. The system of any of the examples 1-35, wherein the one or more programs display the map on a display of a mobile device.

37. The system of any of the examples 32-36, wherein the one or more point features correspond to a presence of a visible sign or a sound-emitting source.

38. A computer implemented system for diagramming a space, comprising:

one or more processors; one or more memories; and one or more programs stored in the one or more memories, wherein the one or more programs (or one or more applications or one or more tools) executed by the one or more processors:

obtain a layout of the space; and
annotate or decorate the layout with meaningful labels that are translatable to glanceable visual signals or audio signals.

39. A computer implemented system of any of the preceding examples 20-38, comprising components stored in the memory that are executed by the processor comprising a map annotator (e.g., for generating highlighted grid lines or point features or labels) that annotate the map and provide the instructions to a display component or speaker component of the mobile device to create or generate the highlighting or indicating of the labels or point features; and a navigation component that extracts or receives the annotations from the map annotator and converts/generates the annotations to actionable navigation instructions and provides the instructions to a display component of the mobile device.

40. A navigation system or mapping system comprising the computer system of any of the examples 20-39, providing navigation guidance to one or more of the labels.

41. The computer implemented system or method of any of the preceding examples 20-40, comprising activating or utilizing the map in real-time to provide navigation instructions in a real-world environment.

42. A computer implemented method, comprising:
receiving a floorplan of an scene;
providing one or more tools for tracing a layout of the floor plan comprising so as to generate an annotated floorplan;
generating a map representing the annotated floorplan in two dimensions or three dimensions;
receiving a scan of an object in a space in the floorplan;
associating the scan with the annotated floorplan, or registering floorplan coordinates of the annotated floor plan with scan coordinates of the scan so as to populate the map with the object correctly positioned in the map.

43. A navigation system or application or a mapping system or application comprising the system of any of the examples 20-41 or using the method of any of the examples 1-19 or 42.

Map Conversion Toolkit and Map Population toolkit

Figure 14:
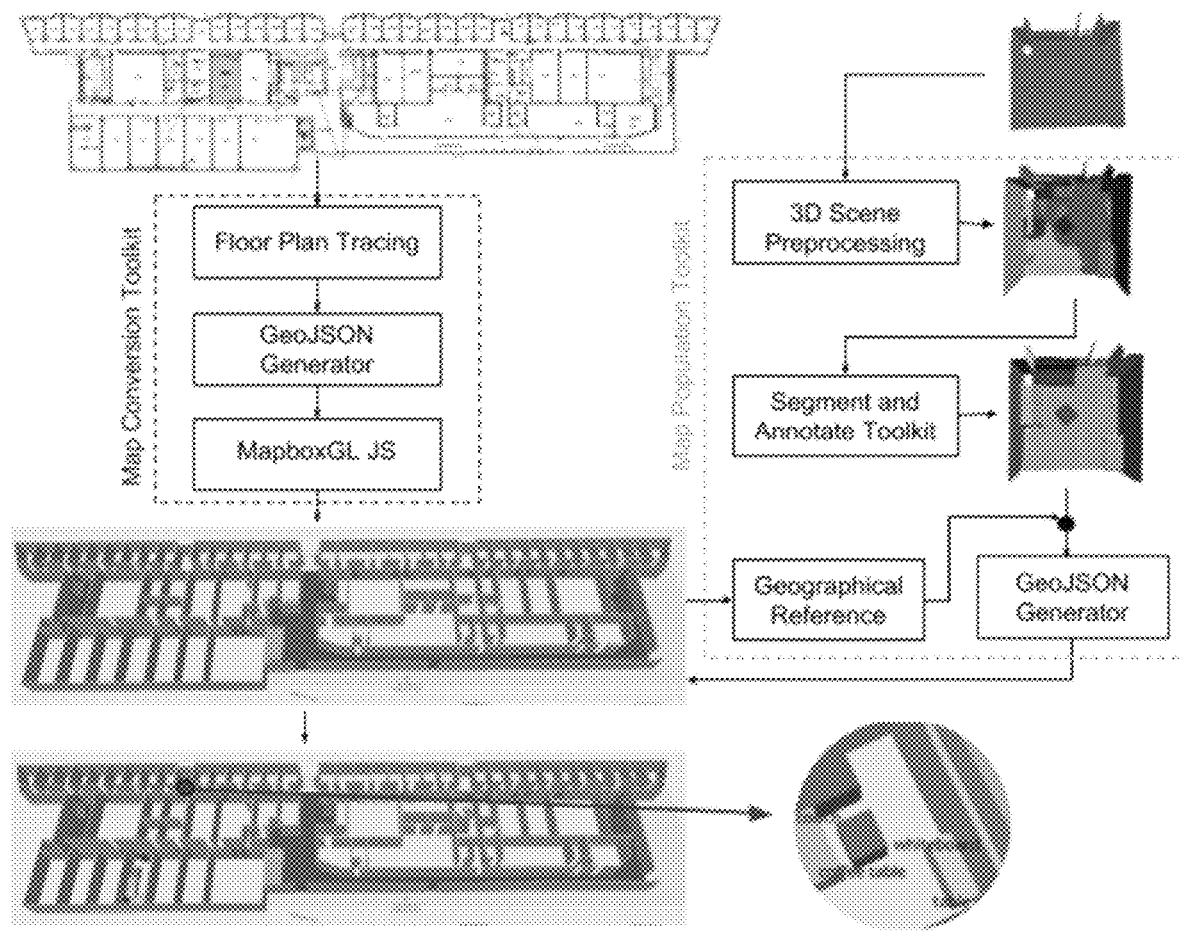
FIG. 14 is a schematic illustrating a map conversion toolkit and map population toolkit according to one or more examples.

FIG. 14 illustrates one or more methods or systems described herein comprising a map conversion toolkit and a map population toolkit.

The map conversion toolkit comprises floor plan tracing; using a generator (e.g., a GeoJSON generator) to generate or render a two dimensional (2D) or three dimensional (3D) representation (e.g., MapboxGL. JS) from the floor plan tracing.

The map population toolkit comprises 3D scene processing (e.g., populating objects in a scene having the floorplan traced in the map conversion toolkit); a segment and annotate toolkit (e.g., generating superpixels identifying the object in the scene); generating a geographical reference from the 2D or 3D representation (e.g., using geodetic coordinates and/or Mapbox GL JS) and using the generator (e.g., GeoJSON generator) to indicate, highlight or annotate the object in the 2D or 3D representation (e.g., GeoJSON GL JS).

Figure 15:
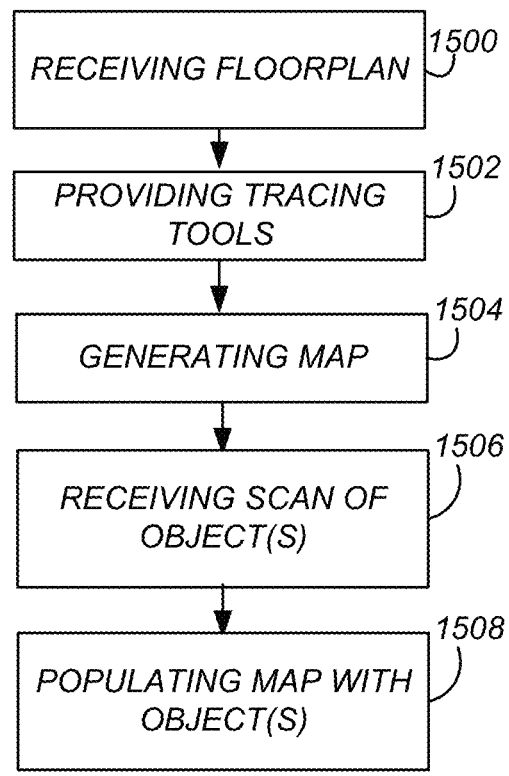
FIG. 15 flowchart illustrating a method of populating map according to one or more examples.

FIG. 15 is a flowchart illustrating a computer implemented method for populating a map. The method comprises the following steps.

Block 1500 represents receiving a floorplan of a scene.

Block 1502 represents providing one or more tools (e.g., floor plan tracing in map conversion toolkit) for tracing a layout of the floorplan so as to generate an annotated floorplan;

Block 1504 represents generating a map (e.g., a vectorized map and/or 2D or 3D representation formed using GeoJSON generator in map conversion toolkit) representing the annotated floorplan in two dimensions or three dimensions;

Block 1506 represents receiving a scan of an object in a space in the floorplan (e.g., in 3D scene preprocessing of map population toolkit). In one or more examples, the scan is obtained using a RGB-D sensor or camera comprising a depth-sensing device that senses in association with a RGB (red, green and blue color) sensor camera. The depth sensing device is able to augment the conventional image with depth information (related with the distance to the sensor) in a per-pixel basis.

Block 1508 represents associating the scan with the annotated floorplan, or registering floorplan coordinates of the annotated floor plan with scan coordinates of the scan (e.g., in 3D scene preprocessing of map population toolkit) so as to populate the map with the object correctly positioned in the map (e.g., using GeoJSON generator and geographical reference such as geodetic coordinates).

The method can be implemented using embodiments 2-19 in the "example embodiments" section. In various examples, the methods and systems described herein are integrated into a practical application (e.g., computer implemented mapping system or navigation system) and improve functioning of the mapping system, navigation system, and/or computers implementing the mapping or navigation system.

Advantages and Improvements

To our knowledge, there is no software available for tracing a floor plan and creating a vectorized version of it. Online software from Google My Map or Mapbox Studio allows is slower and less accurate. The Map Conversion toolkit described herein enables fast and accurate manual tracing of a floor plan image. The Map Population toolkit described herein enables semi-automatic conversion from a 3D scan (taken from a 3D camera) to the same format used by the Map Conversion toolkit.

REFERENCES

[1] Philippe Dosch and Gérald Masini. 1999. Reconstruction of the 3D structure of a building from the 2D drawings of its floors. In Proceedings of the fifth international conference on document analysis and recognition. icdar'99 (cat. no. pr00318). IEEE, 487-490.

[2] Rick Lewis and Carlo Séquin. 1998. Generation of 3d building models from 2d architectural plans. Computer-aided design, 30, 10, 765-779.

[3] Sébastien Macé, Hervé Locteau, Ernest Valveny, and Salva-tore Tabbone. 2010. A system to detect rooms in architectural floor plan images. In Proceedings of the 9th iapr international workshop on document analysis systems. ACM, 167-174.

[4] Sheraz Ahmed, Marcus Liwicki, Markus Weber, and Andreas Dengel. 2012. Automatic room detection and room labeling from architectural floor plans. In 2012 10th iapr international workshop on document analysis systems. IEEE, 339-343.

[5] Lluís-Pere de las Heras, David Fernández, Ernest Valveny, Josep Lladós, and Gemma Sánchez. 2013. Unsupervised wall detector in architectural floor plans. In 2013 12th international conference on document analysis and recognition. IEEE, 1245-1249.

[6] Lucile Gimenez, Sylvain Robert, Frédéric Suard, and Khal-doun Zreik. 2016. Automatic reconstruction of 3d building models from scanned 2d floor plans. Automation in construc-tion, 63, 48-56.

[7] Hanme Jang, Jong Hyeon Yang, and Yu Kiyun. 2018. Auto-matic wall detection and building topology and property of 2d floor plan (short paper). In 10th international conference on geographic information science (giscience 2018). Schloss Dagstuhl-Leibniz-Zentrum fuer Informatik.

[8] Giovanni Pintore, Fabio Ganovelli, Ruggero Pintus, Roberto Scopigno, and Enrico Gobbetti. 2018. 3d floor plan recovery from overlapping spherical images. Computational visual media, 4, 4, 367-383.

[9] Anuradha Madugalla, Kim Marriott, and Simone Marinai. 2017. Partitioning open plan areas in floor plans. In 2017 14th iapr international conference on document analysis and recognition (icdar). Volume 1. IEEE, 47-52.

[10] Samuel Dodge, Jiu Xu, and Björn Stenger. 2017. Parsing floor plan images. In 2017 fifteenth iapr international conference on machine vision applications (mva). IEEE, 358-361.

[11] Chen Liu, Jiajun Wu, Pushmeet Kohli, and Yasutaka Fu-rukawa. 2017. Raster-to-vector: revisiting floorplan transfor-mation. In Proceedings of the ieee international conference on computer vision, 2195-2203.

[12] Guanghui Pan, Jia He, and Rui Fang. 2017. Automatic floor plan detection and recognition. In 2017 2nd international conference on image, vision and computing (icivc). IEEE, 201-205.

[13] Bing Zhou, Mohammed Elbadry, Ruipeng Gao, and Fan Ye. 2017. Batmapper: acoustic sensing based indoor floor plan construction using smartphones. In Proceedings of the 15th annual international conference on mobile systems, applications, and services. ACM, 42-55.

[14] Yukitoshi Kashimoto, Yutaka Arakawa, and Kiichi Yasumoto. 2016. A floor plan creation tool utilizing a smartphone with an ultrasonic sensor gadget. In 2016 13th ieee annual con-sumer communications & networking conference (ccnc). IEEE, 131-136.

[15] Ruipeng Gao, Bing Zhou, Fan Ye, and Yizhou Wang. 2018. Fast and resilient indoor floor plan construction with a single user. Ieee transactions on mobile computing.

[16] Ruipeng Gao, Mingmin Zhao, Tao Ye, Fan Ye, Guojie Luo, Yizhou Wang, Kaigui Bian, Tao Wang, and Xiaoming Li. 2016. Multi-story indoor floor plan reconstruction via mobile crowdsensing. Ieee transactions on mobile computing, 15, 6, 1427-1442.

[17] Chen Liu, Jiaye Wu, and Yasutaka Furukawa. 2018. Floornet: a unified framework for floorplan reconstruction from 3d scans. In Proceedings of the european conference on computer vision (eccv), 201-217.

[18] Howard Butler, Martin Daly, Allan Doyle, Sean Gillies, Stefan Hagen, and Tim Schaub. 2016. The geojson format. Technical report.

[19] Pedro F Felzenszwalb and Daniel P Huttenlocher. 2004. Effi-cient graph-based image segmentation. International journal of computer vision, 59, 2, 167-181.

[20] Angela Dai, Angel X Chang, Manolis Savva, Maciej Halber, Thomas Funkhouser, and Matthias Nießner. 2017. Scannet: richly-annotated 3d reconstructions of indoor scenes. In Proceedings of the ieee conference on computer vision and pattern recognition, 5828-5839.

Conclusion

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented system, comprising:
   one or more processors; one or more non-transitory memories; and one or more programs stored in the one or more non-transitory memories, wherein the one or more programs executed by the one or more processors:
receive a floor plan of a scene;
generate floorplan coordinates of the scene by:
  providing a set of grid lines on the floor plan of the scene:
  highlighting segments of the grid lines selected by a user each of the segments tracing a wall on the floor plan so that the segment is colinear with the wall:
  indicating intersection points between the segments;
  highlighting the intersection points comprising corner intersection points between adjacent walls; and
  storing the corner intersection points as the floorplan coordinates in a database or list;
receive a scan of an object in a space in the floor plan; and
use the floorplan coordinates and scan coordinates of the scan to populate a map, representing the floor plan, with the object correctly positioned in the map.

2. The system of claim 1, further comprising converting the floorplan coordinates into GeoJSON format.

3. The system of claim 1, wherein the one or more programs generate the map by converting the floorplan coordinates, wherein the converting comprises the one or more programs:
  obtaining geodetic coordinates of exterior corners of exterior walls on the floor plan;
  obtaining the floorplan coordinates of the exterior corners;
  determining a transformation function that transforms the geodetic coordinates of the exterior corners to the floorplan coordinates of the exterior walls; and
  converting all the corner intersection points in the floorplan coordinates into the geodetic coordinates using the transformation function.

4. The system of claim 1, wherein the one or more programs:
  obtain the scan of the object in a room of the scene comprising an interior scene mapped using the floor plan, wherein the scan identifies the object using a mesh; and
  orient the mesh with the floor plan.

5. The system of claim 4, wherein the one or more programs orient the mesh so that a room wall of the room identified using the mesh is aligned with a cartesian axis of the floorplan coordinates.

6. The system of claim 5, wherein the one or more programs:
  select all vertices in the mesh whose normal vector is approximately orthogonal to a vertical cartesian axis orthogonal to the floor plan;
  compute one or more angles between one or more of the normal vectors and one of the horizontal cartesian axes lying in the floor plan so that the horizontal cartesian axes are orthogonal to the vertical cartesian axis; and
  select one of the angles and rotate the mesh by a negative of the angle so as to form a re-oriented mesh.

7. The system of claim 6, wherein:
the room wall is one of a plurality of room walls; and
the system further comprises the one or more programs rectifying the mesh so that the room walls in the scan are indicated as being linear or planar.

8. The system of claim 7, wherein the one or more programs rectify by:
  identifying four of the room walls of the room in the scan using the re-oriented mesh;
  projecting the vertices of the re-oriented mesh representing the room walls onto a plane parallel to the floor plan so as to form projections and using a fitting algorithm so as to form the projections into lines representing each of the room walls, wherein the lines intersect to form a quadrilateral; and
  transforming the quadrilateral into a right angle quadrilateral such that the lines intersect at 90 degrees.

9. The system of claim 8, further comprising the one or more programs registering the re-oriented mesh with the floor plan, comprising determining a registration transformation function that rotates and scales the right angle quadrilateral so that the right angle quadrilateral correctly superimposes on the segments tracing the corresponding walls in the floor plan.

10. The system of claim 4, further comprising the one or more programs indicating objects identified in the mesh on the floor plan.

11. The system of claim 10, wherein the indicating comprises:
  generating superpixels corresponding to connected sets of facets on the mesh with similar orientation, so that the superpixels each represent a planar surface patch; and
  highlighting the superpixels selected by the user as identifying the object.

12. The system of claim 1, wherein the one or more programs:
  annotate a layout with at least one meaningful label that is translatable to a glanceable visual signal or an audio signal.

13. The system of claim 12, wherein the glanceable visual signal or the audio signal identifies a room, a lobby, an entrance, a window, center court, or an atrium and the scene comprises an interior or exterior space of a business, residence, public building, university, or plaza.

14. The system of claim 12, wherein;
  at least the one meaningful label comprises a plurality of meaningful labels; and
  the system further comprises the one or more programs partitioning the layout of the space so as to create the meaningful labels comprising navigation information useful for navigating within the space.

15. The system of claim 14, further comprising the one or more programs obtaining the navigation information from a second database populated using crowdsourcing.

16. The system of claim 12, wherein the one or more programs display the map on a display of a mobile device.

17. The system of claim 12, wherein the at least one meaningful label comprises a feature corresponding to a presence of a visible sign or a sound-emitting source.

18. A computer implemented method, comprising:
receiving, in a computer implemented system, a floor plan of a scene;
generating, using the computer implemented system, floorplan coordinates of the scene by;
  providing a set of grid lines on the floor plan of the scene:
  highlighting segments of the grid lines selected by a user each of the segments tracing a wall on the floor plan so that the segment is colinear with the wall;
  indicating intersection points between the segments;
  highlighting the intersection points comprising corner intersection points between adjacent walls; and
  storing the corner intersection points as the floorplan coordinates in a database or list;
receiving, in the computer implemented system, a scan of an object in a space in the floorplan; and
the computer implemented system using the floor plan coordinates with scan coordinates of the scan so as to populate a map, representing the floor plan, with the object correctly positioned in the map.

19. A computer implemented system for diagramming a space, comprising:

one or more processors; one or more non-transitory memories; and one or more programs stored in the one or more non-transitory memories, wherein the one or more programs executed by the one or more processors:

obtain a layout of the space; and annotate the layout with a meaningful label that is translatable to a glanceable visual signal or an audio signal, wherein;

the signal comprises a sign comprising a name designating a presence and a location of an object or sound emitting source in the Space, the meaningful label translates, into the glanceable visual signal or an audio signal in response to activation by a user navigating using a map of the layout, and the activation comprises clicking or touching the meaningful label comprising a point feature on the map.

20. The system of claim 12, wherein:

the signal comprises a sign comprising a name designating a presence and location of designated object or a sound emitting source in the space, the meaningful label translates into the glanceable visual signal or the audio signal in response to activation by a navigating user navigating using the map of the layout, and the activation comprises clicking or touching the meaningful label comprising a point feature on the map.

21. The computer implemented method of claim 18, further comprising the computer implemented system using a toolkit allowing the user to define the grid lines and click on the segments so as to select the segments.

* * * * *